US011445206B2

(12) United States Patent
Zhao et al.

(10) Patent No.: US 11,445,206 B2
(45) Date of Patent: Sep. 13, 2022

(54) METHOD AND APPARATUS FOR VIDEO CODING

(71) Applicant: Tencent America LLC, Palo Alto, CA (US)

(72) Inventors: Xin Zhao, Santa Clara, CA (US); Lien-Fei Chen, Taipei (TW); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/211,585

(22) Filed: Mar. 24, 2021

(65) Prior Publication Data

US 2021/0329271 A1 Oct. 21, 2021

Related U.S. Application Data

(60) Provisional application No. 63/011,119, filed on Apr. 16, 2020.

(51) Int. Cl.
*H04N 19/186* (2014.01)
*H04N 19/61* (2014.01)
*H04N 19/96* (2014.01)

(52) U.S. Cl.
CPC ........... *H04N 19/186* (2014.11); *H04N 19/61* (2014.11); *H04N 19/96* (2014.11)

(58) Field of Classification Search
CPC ....... H04N 19/186; H04N 19/61; H04N 19/96
USPC .................................................. 375/240.18
See application file for complete search history.

(56) References Cited

U.S. PATENT DOCUMENTS

| 2015/0358631 | A1* | 12/2015 | Zhang | H04N 19/593 |
| | | | | 375/240.16 |
| 2016/0360198 | A1* | 12/2016 | Chang | H04N 19/186 |
| 2018/0192076 | A1* | 7/2018 | Ikai | H04N 19/44 |
| 2019/0158846 | A1* | 5/2019 | Moon | H04N 19/176 |

OTHER PUBLICATIONS

Fuldseth, et al., "Transform design for HEVC with 16 bit intermediate data representation", JCTVC-E243, 2006, (20 pages).

(Continued)

*Primary Examiner* — Matthew K Kwan
(74) *Attorney, Agent, or Firm* — ArentFox Schiff LLP

(57) ABSTRACT

A method for video decoding in a decoder is provided. In the method, first signaling information and second signaling information is determined from a coded video bitstream of a coded region. The first signaling information is indicative of a first maximum transform size of the coded region of a first prediction mode, and the second signaling information is indicative of a second maximum transform size of the coded region of a second prediction mode. Further, whether transform signaling information is included in the coded video bitstream is determined based on the first signaling information and the second signaling information. The transform signaling information indicates whether an adaptive color transform (ACT) is applied on the coded region. The coded region is subsequently decoded based on the transform signaling information.

20 Claims, 13 Drawing Sheets

(56) References Cited

OTHER PUBLICATIONS

Fuldseth, et al., "Transform design for HEVC with 16 bit intermediate data representation", JCTVC-E243, Joint Collaborative Team on Video Coding (JCT-VC) of ITU-T SG16 WP3 and ISO/IEC JTC1/SC29/WG11, 5th Meeting: Geneva, CH, Mar. 16-23, 2011, (16 pages).
Appendix A, JCTVC E243 16bit HighQP 1 (2 pages).
Appendix B, JCTVC E243 16bit LowQP (2 pages).
Appendix C, JCTVC E243 16bit NormalQP (2 pages).
Appendix D, JCTVC E243 18bit HighQP (3 pages).
Appendix E, JCTVC E243 18bit LowQP (3 pages).
Appendix F, JCTVC E243 18bit NormalQP (4 pages).
Appendix G, JCTVC E243 Clip HighQP (2 pages).
Appendix H, JCTVC E243 Clip LowQP (2 pages).
Appendix I, JCTVC E243 Clip NormalQP (2 pages).
International Search Report and Written Opinion dated Jul. 20, 2021 in PCT/US 21/26872.

\* cited by examiner

METHOD AND APPARATUS FOR VIDEO CODING

INCORPORATION BY REFERENCE

This present application claims the benefit of priority to U.S. Provisional Application No. 63/011,119, "ADAPTIVE MAX TRANSFORM SIZE CONTROL" filed on Apr. 16, 2020, which is incorporated by reference herein in its entirety.

TECHNICAL FIELD

The present disclosure describes embodiments generally related to video coding. More specially, embodiments for controlling a max transform size are provided.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p604:2:0 video at 8 bit per sample (1920×1080 luminance sample resolution at 60 Hz frame rate) requires close to 1.5 Gbit/s bandwidth. An hour of such video requires more than 600 gigabytes (GB) of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes receiving circuitry and processing circuitry.

According to an aspect of the disclosure, a method for video decoding in a decoder is provided. In the method, first signaling information and second signaling information can be determined from a coded video bitstream of a coded region. The first signaling information can be indicative of a first maximum transform size of the coded region of a first prediction mode, and the second signaling information can be indicative of a second maximum transform size of the coded region of a second prediction mode. Further, whether transform signaling information is included in the coded video bitstream can be determined based on the first signaling information and the second signaling information. The transform signaling information can indicate whether an adaptive color transform (ACT) is applied on the coded region. The coded region can subsequently be decoded based on the transform signaling information.

In the method, the first signaling information can indicate the first maximum transform size of the coded region is 64 samples when the first signaling information is a first value. The second signaling information can indicate the second maximum transform size of the coded region is 64 samples when the second signaling information is the first value.

In the method, the coded video bitstream can further include partition signaling information, where the partition signaling information can indicate whether a dual tree partition is applied to the coded region.

In some embodiments, the transform signaling information can be determined whether is included in the coded video bitstream based on one of (i) the first signaling information indicating the first maximum transform size of the coded region of the first prediction mode is 32 samples, and the partition signaling information indicating the dual tree partition is not applied to the coded region, and (ii) the second signaling information indicating the second maximum transform size of the coded region of the second prediction mode is 32 samples.

In some embodiments, the first signaling information can be determined based on the partition signaling information indicating the dual tree partition is applied to the coded region.

In some embodiments, the first signaling information and the second signaling information can be determined based on the partition signaling information indicating the dual tree partition is applied to the coded region.

In some embodiments, the first maximum transform size can be equal to the second maximum transform size based on the partition signaling information indicating the dual tree partition is not applied to the coded region.

In the method, the first signaling information and the second signaling information can be indicated by a syntax element in one of a sequence parameter set, a picture parameter set, and a slice header.

According to another aspect of the disclosure, a method of video decoding for a decoder is provided. In the method, first signaling information and second signaling information can be received from a coded video bitstream of a coded region. The first signaling information can indicate a first maximum transform size of the coded region based on a first partition mode. The second signaling information can indicate a second maximum transform size of the coded region based on a second partition mode. Further, transform signaling information can be determined from the coded video bitstream, where the transform signaling information can indicate whether an adaptive color transform (ACT) is applied on the coded region. The coded region can subsequently be decoded based on the transform signaling information.

In the method, the first signaling information can indicate the first maximum transform size of the coded region is 64 samples when the first signaling information is a first value, and the second signaling information can indicate the second maximum transform size of the coded region is 64 samples when the second signaling information is the first value.

In some embodiments, the transform signaling information can be determined based on the second signaling information indicating the second maximum transform size of the coded region based on the second partition mode is 32 samples.

In some embodiments, a maximum transform size of the coded region can be determined to be 32 based on the second partition mode being applied and the transform signaling information indicating the ACT is applied on the coded region.

In some embodiments, a maximum transform size of the coded region can be determined to be 64 samples based on one of (i) the second partition mode not being applied, and (ii) the transform signaling information indicating the ACT is not applied on the coded region.

In some examples, the apparatus for video decoding that includes the receiving circuitry and the processing circuitry is configured to perform one or more of the methods described above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
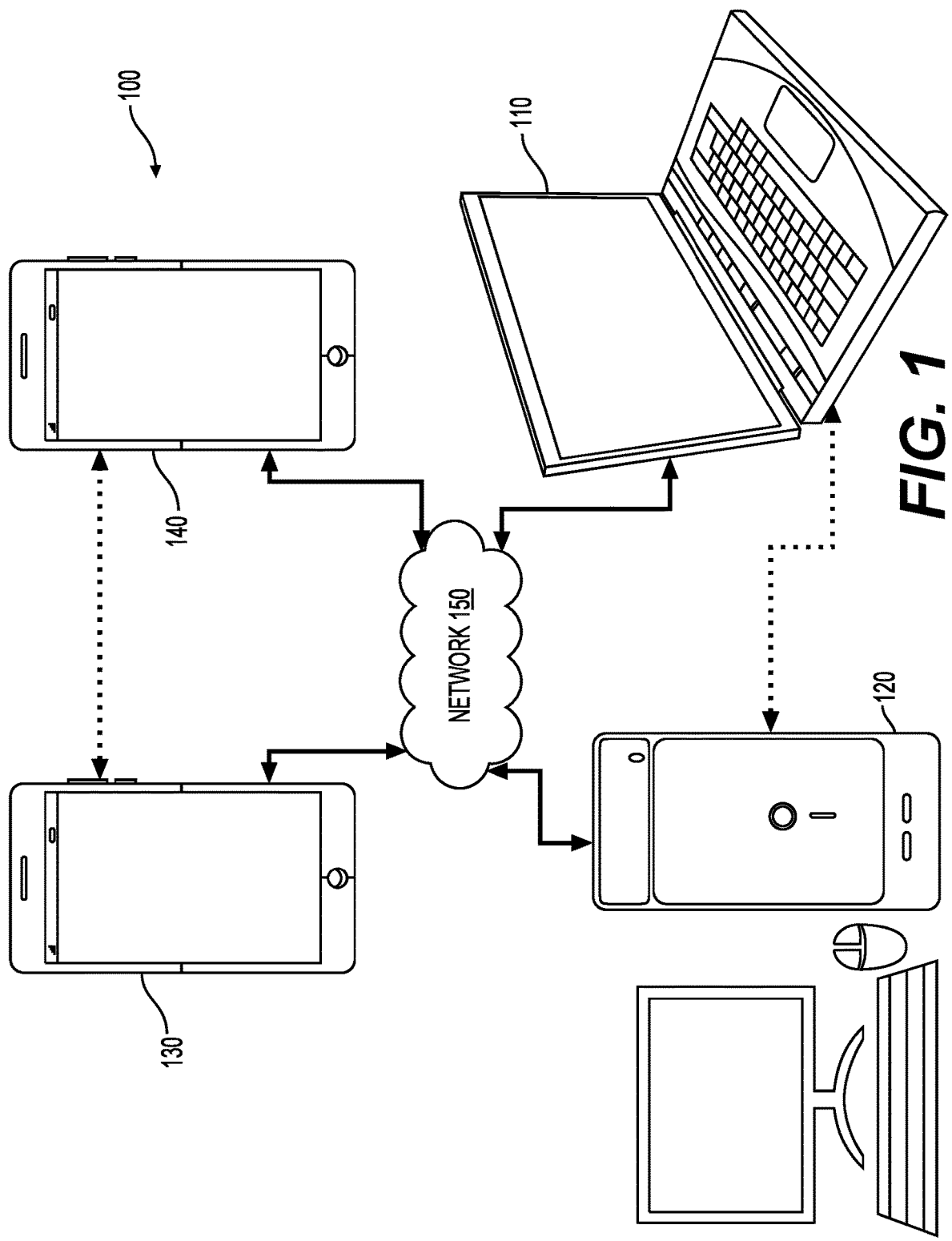
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
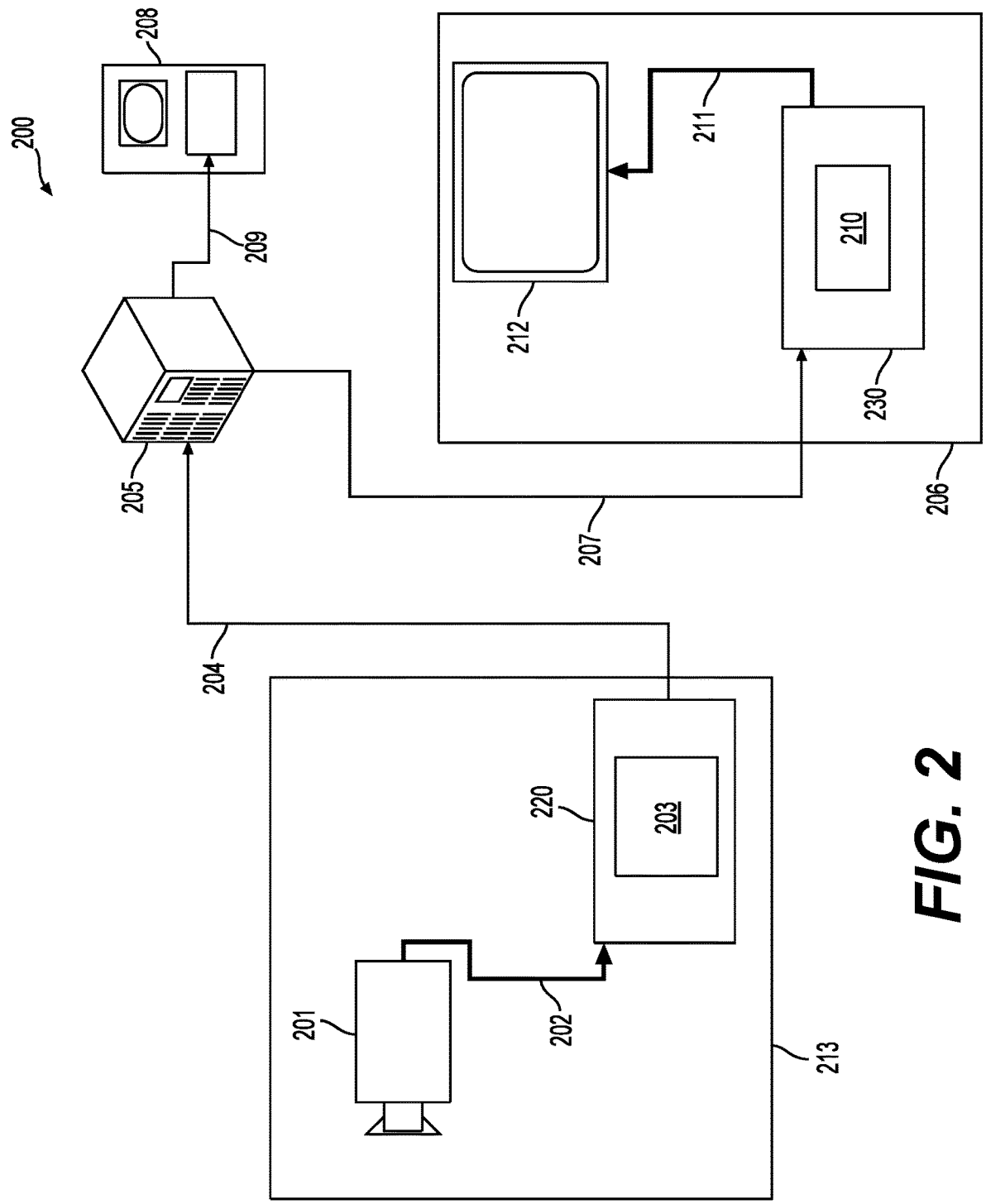
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
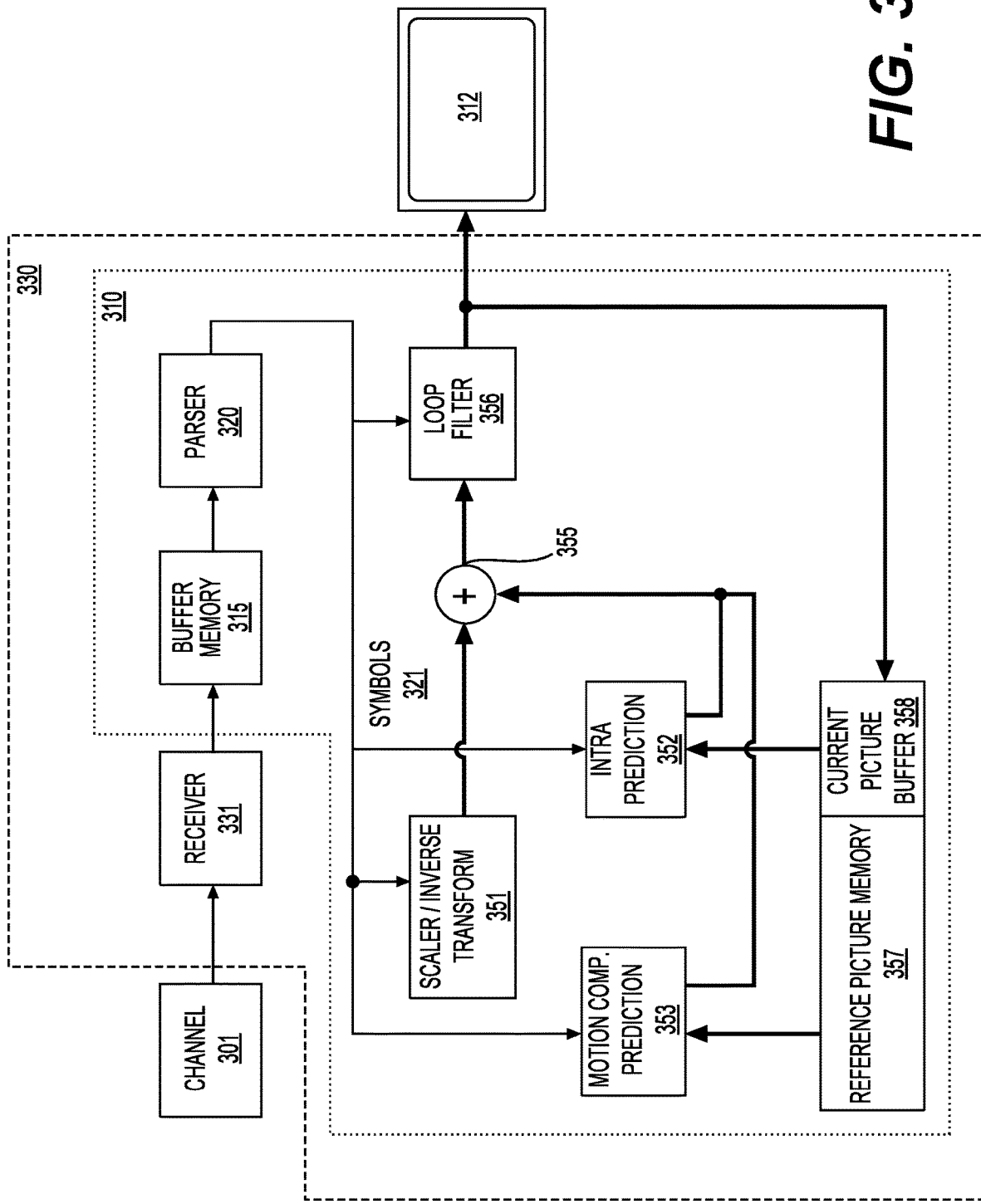
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD)

specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
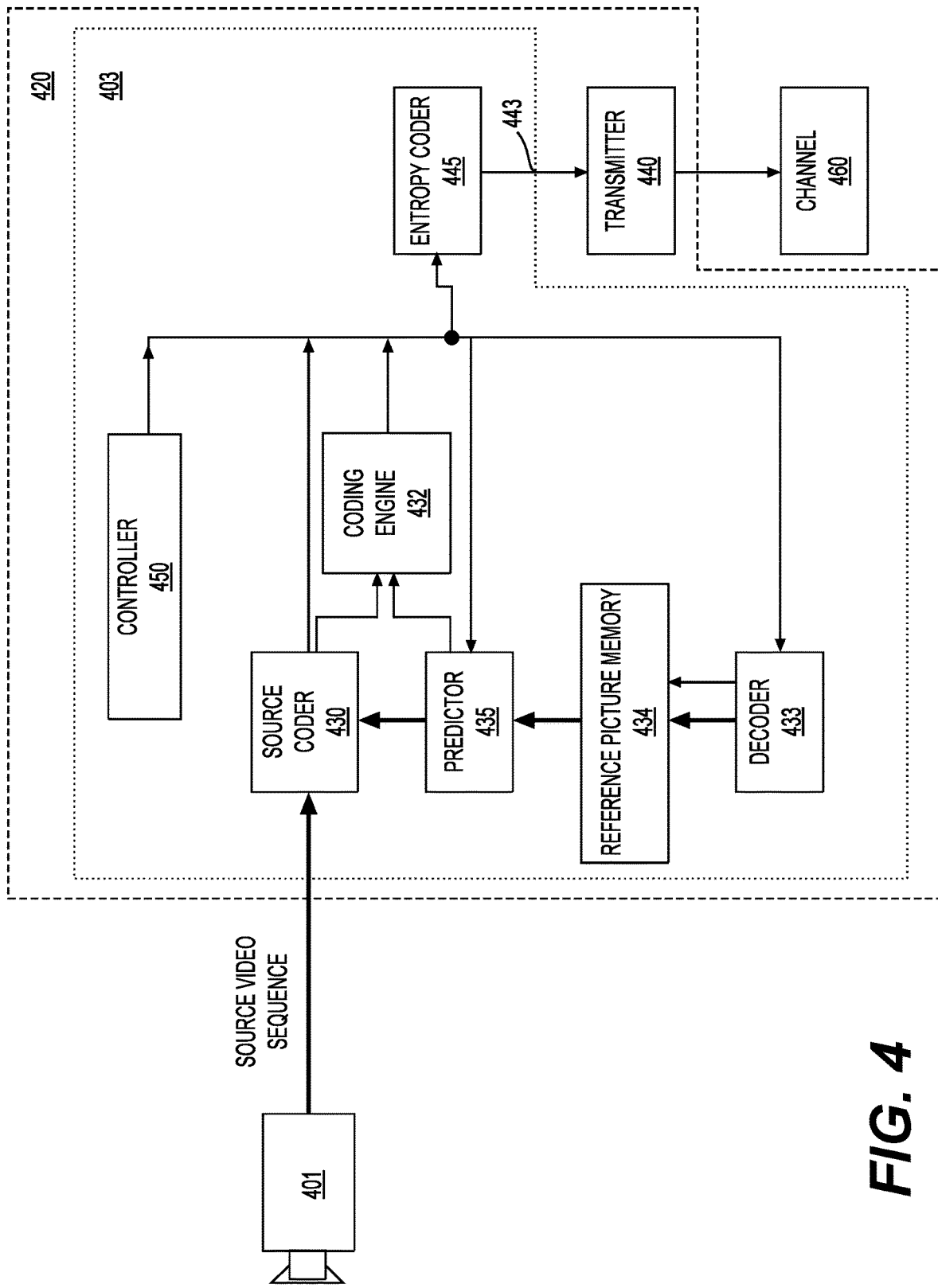
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
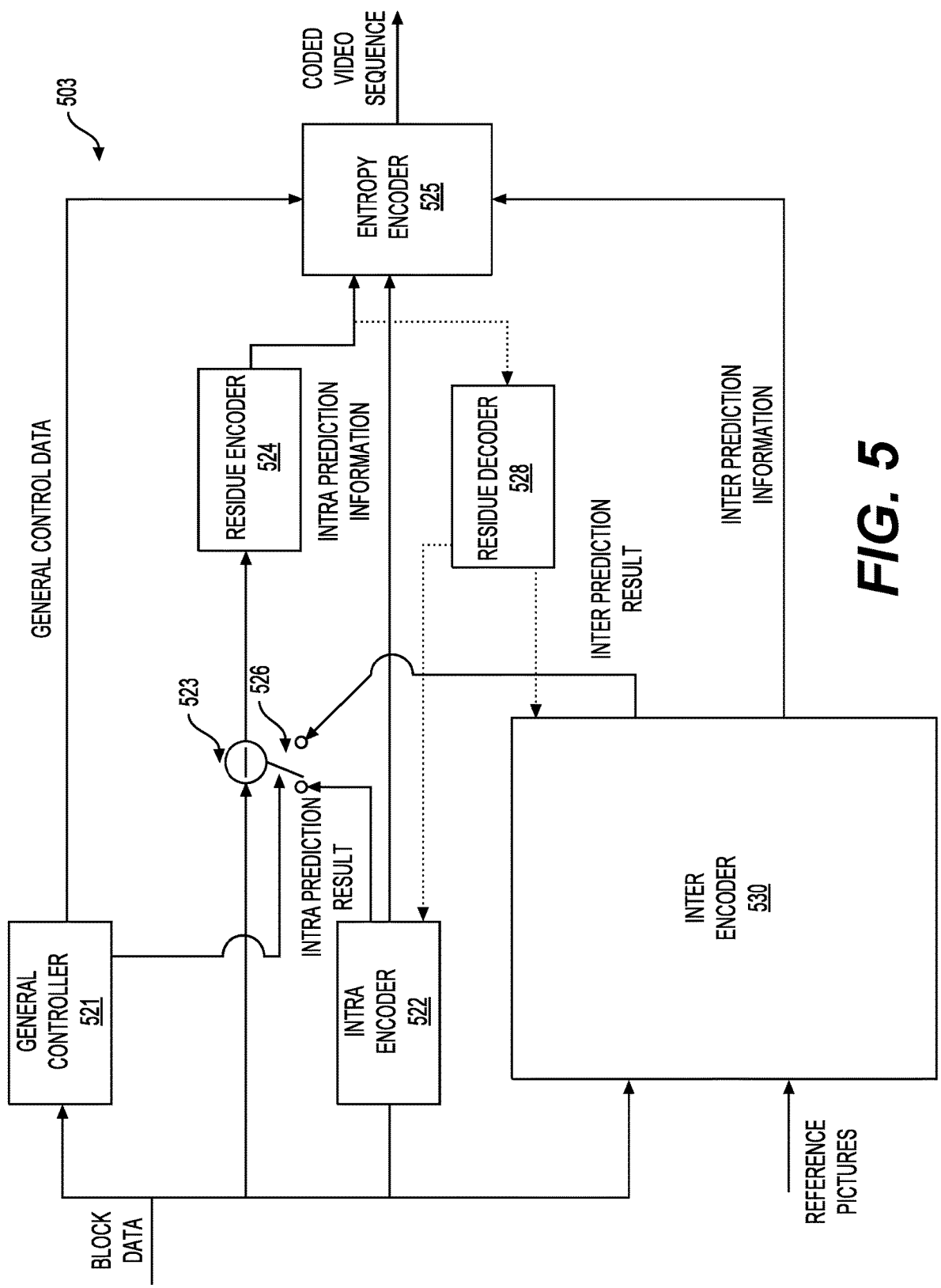
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
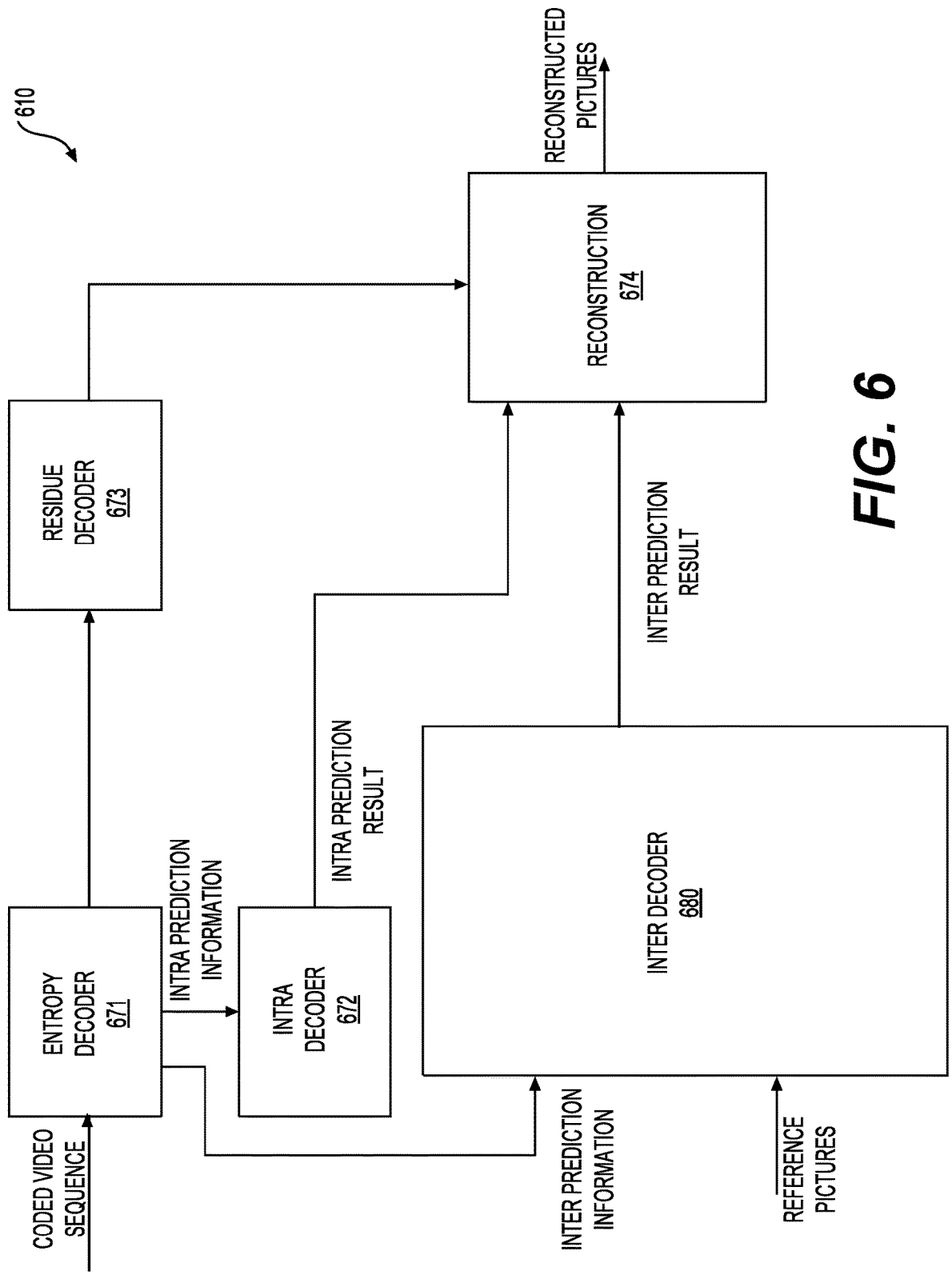
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques for the next-generation video coding beyond HEVC (High Efficiency Video Coding), e.g., Versatile Video Coding (VVC). For example, schemes can be provided for controlling (i) a max transform size and (ii) an interaction between the max transform size and transform partitioning schemes (e.g., sub-block transform (SBT) and Intra sub-partitioning (ISP)).

In HEVC, a coding tree unit (CTU) can be split into a plurality of coding units (CUs) by using a quadtree structure that is denoted as a coding tree to adapt to various local characteristics. A decision on whether to code a picture area using inter-picture (temporal) or intra-picture (spatial) prediction can be made at the CU level. Each CU can be further split into one, two, or four prediction units (PUs) according to the PU splitting type. Inside one PU, the same prediction process can be applied and the relevant information can be transmitted to the decoder on a PU basis. After obtaining the residual block by applying the prediction process based on the PU splitting type, a CU can be partitioned into transform units (TUs) according to another quadtree structure like the coding tree for the CU. A key feature of the HEVC structure is that the HEVC can have the multiple partition conceptions including CU, PU, and TU. In HEVC, a CU or a TU can only be a square shape, while a PU may be a square or rectangular shape for an inter predicted block. In HEVC, one coding block may be further split into four square sub-blocks, and a transform can be performed on each sub-block (i.e., TU). Each TU can be further split recursively (e.g., using quadtree split) into smaller TUs, which is called Residual Quad-Tree (RQT).

At a picture boundary, HEVC can employ implicit quad-tree split so that a block can keep quad-tree splitting until the size fits the picture boundary.

Figure 7A:
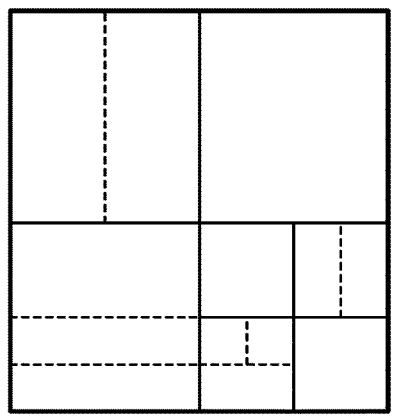
FIG. 7A shows an exemplary block partitioning by using quad-tree plus binary tree (QTBT).
Figure 7B:
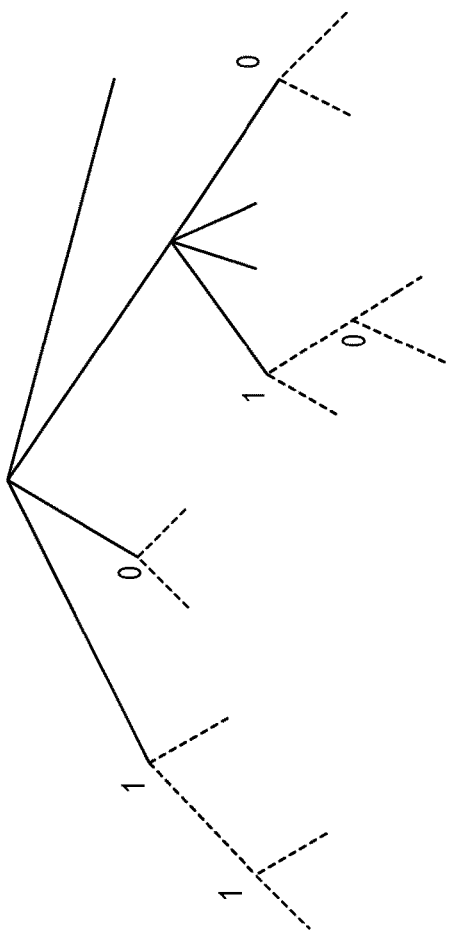
FIG. 7B shows a corresponding tree representation of the exemplary block partitioning by using the QTBT.

In VVC, a block partitioning structure using quad-tree (QT) plus binary tree (BT) is proposed. The QTBT structure can remove the concepts of multiple partition types. For example, the QTBT structure can remove the separation of the CU, PU, and TU concepts, and support more flexibility for CU partition shapes. In the QTBT block structure (or QTBT structure), a CU can have either a square or rectangular shape. As shown in FIGS. 7A and 7B, a CTU can be first partitioned by a quadtree structure. The quadtree leaf nodes can further be partitioned by a binary tree structure. There are two splitting types, symmetric horizontal splitting and symmetric vertical splitting, in the binary tree splitting. The binary tree leaf nodes can be called CUs, and that segmentation can be used for prediction and transform processing without any further partitioning. Thus, the CU, PU, and TU can have the same block size in the QTBT coding block structure. In the experimental software Joint Exploration Model (JEM), a CU sometimes can include coding blocks (CBs) of different colour components. For example, one CU can contain one luma CB and two chroma CBs in the case of P and B slices of the 4:2:0 chroma format. One CU sometimes can include a CB of a single component. For example, one CU can contain only one luma CB or just two chroma CBs in the case of I slices.

In some embodiments, the following parameters can be defined for the QTBT partitioning scheme: (1) CTU size refers to a root node size of a quadtree, which has a same concept as in HEVC; (2) MinQTSize refers to a minimum allowed quadtree leaf node size; (3) MaxBTSize refers to a maximum allowed binary tree root node size; (4) MaxBTDepth refers to a maximum allowed binary tree depth; and (5) MinBTSize refers to a minimum allowed binary tree leaf node size.

In one example of the QTBT partitioning structure (or QTBT structure), the CTU size can be set as 128×128 luma samples with two corresponding 64×64 blocks of chroma samples, the MinQTSize can be set as 16×16, the MaxBTSize can be set as 64×64, the MinBTSize (for both width and height) can be set as 4×4, and the MaxBTDepth can be set as 4. The quadtree partitioning can be applied to the CTU first to generate a plurality of quadtree leaf nodes. The quadtree leaf nodes may have a size from 16×16 (i.e., the MinQTSize) to 128×128 (i.e., the CTU size). If the leaf quadtree node is 128×128, the leaf quadtree may not be further split by the binary tree since the size exceeds the MaxBTSize (i.e., 64×64). Otherwise, the leaf quadtree node could be further partitioned by the binary tree. Therefore, the quadtree leaf node can also be the root node for the binary tree and the quadtree leaf can have the binary tree depth as 0. When the binary tree depth reaches MaxBTDepth (e.g., 4), no further splitting is considered. When the binary tree node has a width equal to MinBTSize (e.g., 4), no further horizontal splitting is considered. Similarly, when the binary tree node has a height equal to MinBTSize, no further vertical splitting is considered. The leaf nodes of the binary tree can further be processed by prediction and transform processing without any further partitioning. In the JEM, the maximum CTU size can be 256×256 luma samples.

FIG. 7A illustrates an example of block partitioning by using QTBT, and FIG. 7B illustrates the corresponding tree representation. The solid lines can indicate quadtree splitting and dotted lines can indicate binary tree splitting. In each splitting (e.g., non-leaf) node of the binary tree, one flag can be signaled to indicate which splitting type (e.g., horizontal or vertical) is used, where 0 can indicate a horizontal splitting and 1 can indicate a vertical splitting. For the quadtree splitting, there is no need to indicate the splitting type since quadtree splitting always splits a block both horizontally and vertically to produce 4 sub-blocks with an equal size.

In addition, the QTBT scheme (or QTBT structure) can provide flexibility for the luma and chroma to have a separate QTBT structure. Currently, for P and B slices, the luma and chroma CTBs in one CTU share a same QTBT structure. However, for I slices, the luma CTB is partitioned into CUs by a QTBT structure, and the chroma CTBs are partitioned into chroma CUs by another QTBT structure. Thus, a CU in an I slice can include a coding block of the luma component or coding blocks of two chroma components, and a CU in a P or B slice can include coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

Figure 8B:
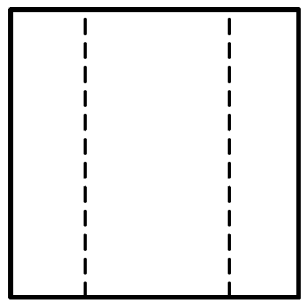
FIG. 8B shows a horizontal center-side triple-tree partitioning.
Figure 8A:
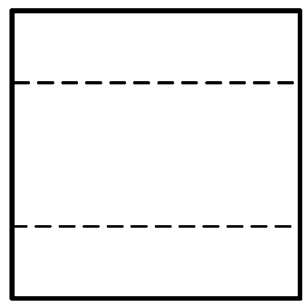
FIG. 8A shows a vertical center-side triple-tree partitioning.

In VCC, a Multi-type-tree (MTT) structure is also proposed. The MTT is a more flexible tree structure than QTBT. In MTT, other than quad-tree and binary-tree, horizontal and vertical center-side triple-trees are introduced, for example as shown in FIGS. 8A and 8B. FIG. 8A is a vertical center-side triple-tree partitioning, and FIG. 8B is a horizontal center-side triple-tree partitioning. Key benefits of the triple-tree partitioning can include: (a) the triple-tree partitioning can complement the quad-tree and binary-tree partitioning. The triple-tree partitioning is able to capture objects located in the block center while quad-tree and binary-tree are always split along the block center. (b) The width and height of the partitions of the proposed triple trees are always a power of 2 so that no additional transforms are needed. The design of two-level tree is mainly motivated by complexity reduction. Theoretically, the complexity of traversing of a tree is $T^D$, where T denotes the number of split types, and D is the depth of tree.

In HEVC, the primary transforms can be 4-point, 8-point, 16-point, and 32-point DCT-2, and the transform core matrices can be represented using 8-bit integers (i.e., 8-bit transform core). The transform core matrices of smaller DCT-2 can be part of a larger DCT-2, as shown below.

4 × 4 transform

{64, 64, 64, 64}
{83, 36, −36, −83}
{64, −64, −64, 64}
{36, −83, 83, −36}

8 × 8 transform

{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18}

16 × 16 transform

{64 64 64 64 64 64 64 64 64 64 64 64 64 64 64 64}
{90 87 80 70 57 43 25 9 −9 −25 −43 −57 −70 −80 −87 −90}
{89 75 50 18 −18 −50 −75 −89 −89 −75 −50 −18 18 50 75 89}
{87 57 9 −43 −80 −90 −70 −25 25 70 90 80 43 −9 −57 −87}
{83 36 −36 −83 −83 −36 36 83 83 36 −36 −83 −83 −36 36 83}
{80 9 −70 −87 −25 57 90 43 −43 −90 −57 25 87 70 −9 −80}
{75 −18 −89 −50 50 89 18 −75 −75 18 89 50 −50 −89 −18 75}
{70 −43 −87 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 87 43 70 −70 −43 87 9 −90 25 80 −57}
{50 −89 18 75 −75 −18 89 −50 −50 89 −18 −75 75 18 −89 50}
{43 −90 57 25 −87 70 9 −80 80 −9 −70 87 −25 −57 90 −43}
{36 −83 83 −36 −36 83 −83 36 36 −83 83 −36 −36 83 −83 36}
{25 −70 90 −80 43 9 −57 87 −87 57 −9 −43 80 −90 70 −25}
{18 −50 74 −89 89 −75 50 −18 −18 50 −75 89 −89 75 −50 18}
{9 −25 43 −57 70 −80 87 −90 90 −87 70 57 −43 25 −9}

32 × 32 transform

{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4 −13 −22 −31 −38 −46 −54 −61 −67 −73 −78 −82 −85 −88 −90 −90}
{90 87 80 70 57 43 25 9 −9 −25 −43 −57 −70 −80 −87 −90 −90 −87 −80 −70 −57 −43 −25 −9 9 25 43 57 70 80 87 90}
{90 82 67 46 22 −4 −31 −54 −73 −85 −90 −88 −78 −61 −38 −13 13 38 61 78 88 90 85 73 54 31 4 −22 −46 −67 −82 −90)
{89 75 50 18 −18 −50 −75 −89 −89 −75 −50 −18 18 50 75 89 89 75 50 18 −18 −50 −75 −89 −89 −75 −50 −18 18 50 75 89}
{88 67 31 −13 −54 −82 −90 −78 −46 −4 38 73 90 85 61 22 −22 −61 −85 −90 −73 −38 4 46 78 90 82 54 13 −31 −67 −88}
{87 57 9 −43 −80 −90 −70 −25 25 70 90 80 43 −9 −57 −87 −87 −57 −9 43 80 90 70 25 −25 −70 −90 −80 −43 9 57 87}
{85 46 −13 −67 −90 −73 −22 38 82 88 54 −4 −61 −90 −78 −31 31 78 90 61 4 −54 −88 −82 −38 22 73 90 67 13 −46 −85}
{83 36 −36 −83 −83 −36 36 83 83 36 −36 −83 −83 −36 36 83 83 36 −36 −83 −83 −36 36 83 83 36 −36 −83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 −80 −9 70 87 25 −57 −90 −43 43 90 57 −25 −87 −70 9 80}
{78 −4 −82 −73 13 85 67 −22 −88 −61 31 90 54 −38 −90 −46 46 90 38 −54 −90 −31 61 88 22 −67 −85 −13 73 82 4 −78}

-continued

```
{75 -18 -89 -50 50 89 18 -75 -75 18 89 50 -50 -89 -18 75 75 -18 -89 -50 50 89 18 -75 -75 18 89 50 -50 -89 -18 75}
{73 -31 -90 -22 78 67 -38 -90 -13 82 61 -46 -88 -4 85 54 -54 -85 4 88 46 -61 -82 13 90 38 -67 -78 22 90 31 -73}
{70 -43 -87 9 90 25 -80 -57 57 80 -25 -90 -9 87 43 -70 -70 43 87 -9 -90 -25 80 57 -57 -80 25 90 9 -87 -43 70}
{67 -54 -78 38 85 -22 -90 4 90 13 -88 -31 82 46 -73 -61 61 73 -46 -82 31 88 -13 -90 -4 90 22 -85 -38 78 54 -67}
{64 -64 -64 64 64 -64 -64 64 64 -64 -64 64 64 -64 -64 64 64 -64 -64 64 64 -64 -64 64 64 -64 -64 64 64 -64 -64 64}
{61 -73 -46 82 31 -88 -13 90 -4 -90 22 85 -38 -78 54 67 -67 -54 78 38 -85 -22 90 4 -90 13 88 -31 -82 46 73 -61}
{57 -80 -25 90 -9 -87 43 70 -70 -43 87 9 -90 25 80 -57 -57 80 25 -90 9 87 -43 -70 70 43 -87 -9 90 -25 -80 57}
{54 -85 -4 88 -46 -61 82 13 -90 38 67 -78 -22 90 -31 -73 73 31 -90 22 78 -67 -38 90 -13 -82 61 46 -88 4 85 -54}
{50 -89 18 75 -75 -18 89 -50 -50 89 -18 -75 75 18 -89 50 50 -89 18 75 -75 -18 89 -50 -50 -89 -18 -75 745 18 -89 50}
{46 -90 38 54 -90 31 61 -88 22 67 -85 13 73 -82 4 78 -78 -4 82 -73 -13 85 -67 -22 88 -61 -31 90 -54 -38 90 -46}
{43 -90 57 25 -87 70 9 -80 80 -9 -70 87 -25 -57 90 -43 -43 90 -57 -25 87 -90 -9 80 -80 9 70 -87 25 57 -90 43}
{38 -88 73 -4 -67 90 -46 -31 85 -78 13 61 -90 54 22 -82 82 -22 -54 90 -61 -13 78 -85 31 46 -90 67 4 -73 88 -38}
{36 -83 83 -36 -36 83 83 36 36 -83 83 -36 -36 83 -83 36 36 -83 83 -36 -36 83 -83 36 36 -83 83 -36 -36 83 -83 36}
{31 -78 90 -61 4 54 -88 82 -38 -22 73 -90 67 -13 -46 85 -88 46 13 -67 90 -73 22 38 -82 88 -54 -4 61 -90 78 -31}
{25 -70 90 -80 43 9 -57 87 -87 57 -9 -43 80 -90 70 -25 -25 70 -90 80 -43 -9 57 -87 87 -57 9 43 -80 90 -70 25}
{22 -61 85 -90 73 -38 -4 46 -78 90 -82 54 -13 -31 67 -88 88 -67 31 13 -54 82 -90 78 -46 4 38 -73 90 -85 61 -22}
{18 -50 75 -89 89 -75 80 -18 -18 50 -75 89 -89 75 -50 18 18 -50 75 -89 89 -75 50 -18 -18 50 -75 89 -89 75 15 18}
{13 -38 61 -78 88 -90 85 -73 54 -31 40 22 -46 67 -82 90 -90 82 -67 46 -22 -4 31 -54 73 -85 90 -88 78 -61 38 -13}
{9 -25 43 -57 70 -80 87 -90 90 -87 80 -70 57 -43 25 -9 -9 25 -43 57 -70 80 -87 90 -90 87 -80 70 -57 43 -25 9}
{4 -13 22 -31 38 -46 54 -61 67 -73 78 -82 85 -88 90 -90 90 -90 88 -85 82 -78 73 -67 61 -54 46 -38 31 -22 13 -4}
```

The DCT-2 cores show symmetry/anti-symmetry characteristics. Thus, a so-called "partial butterfly" implementation is supported to reduce the number of operation counts (multiplications, adds/subs, shifts), and identical results of matrix multiplication can be obtained using partial butterfly.

In VVC, besides 4-point, 8-point, 16-point, and 32-point DCT-2 transforms which are the same as HEVC, additional 2-point and 64-point DCT-2 are also included. The 64-point DCT-2 core defined in VVC can be shown below as a 64×64 matrix:

```
{
{aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa, aa, aa, aa, aa, aa, aa, aa,
aa, aa, aa, aa, aa, aa, aa, aa, aa, aa, aa, aa, aa, aa, aa, aa}
{bf, bg, bh, bi, bj, bk, bl, bm, bn, bo, bp, bq, br, bs, bt, bu, bv, bw, bx, by, bz, ca,
cb, cc, cd, ce, cf, cg, ch, ci, cj, ck, -ck, -cj, -ci, -ch, -cg, -cf, -ce, -cd, -cc, -cb, -ca, -bz, -by,
-bx, -bw, -bv, -bu, -bt, -bs, -br, -bq, -bp, -bo, -bn, -bm, -bl, -bk, -bj, -bi, -bh, -bg, -bf}
{ap, aq, ar, as, at, au, av, aw, ax, ay, az, ba, bb, bc, bd, be, -be, -bd, -bc, -bb, -ba, -az,
-ay, -ax, -aw, -av, -au, -at, -as, -ar, -aq, -ap, -ap, -aq, -ar, -as, -at, -au, -av, -aw, -ax, -ay, -az, -ba,
-bb, -bc, -bd, -be, be, bd, bc, bb, ba, az, ay, ax, aw, av, au, at, as, ar, aq, ap}
{bg, bj, bm, bp, bs, bv, by, cb, ce, ch, ck, -ci, -cf, -cc, -bz, -bw, -bt, -bq, -bn, -bk, -bh, -bf,
-bi, -bl, -bo, -br, -bu, -bx, -ca, -cd, -cg, -cj, cj, cg, cd, ca, bx, bu, br, bo, bl, bi, bf, bh, bk,
bn, bq, bt, bw, bz, cc, cf, ci, -ck, -ch, -ce, -cb, -by, -bv, -bs, -bp, -bm, -bj, -bg}
{ah, ai, aj, ak, al, am, an, ao, -ao, -an, -am, -al, -ak, -aj, -ai, -ah, -ah, -ai, -aj, -ak, -al, -am,
-an, -ao, ao, an, am, al, ak, aj, ai, ah, ah, ai, aj, ak, al, am, an, ao, -ao, -an, -am, -al, -ak,
-aj, -ai, -ah, -ah, -ai, -aj, -ak, -al, -am, -an, -ao, ao, an, am, al, ak, aj, ai, ah}
{bh, bm, br, bw, cb, cg, -ck, -cf, -ca, -bv, -bq, -bl, -bg, -bi, -bn, -bs, -bx, -cc, -ch, cj, ce, bz,
bu, bp, bk, bf, bj, bo, bt, by, cd, ci, -ci, -cd, -by, -bt, -bo, -bj, -bf, -bk, -bp, -bu, -bz, -ce, -cj,
ch, cc, bx, bs, bn, bi, bg, bl, bq, bv, ca, cf, ck, -cg, -cb, -bw, -br, -bm, -bh}
{aq, at, aw, az, bc, -be, -bb, -ay, -av, -as, -ap, -ar, -au, -ax, -ba, -bd, bd, ba, ax, au, ar, ap,
as, av, ay, bb, be, -bc, -az, -aw, -at, -aq, -aq, -at, -aw, -az, -bc, be, bb, ay, av, as, ap, ar, au,
ax, ba, bd, -bd, -ba, -ax, -au, -ar, -ap, -as, -av, -ay, -bb, -be, bc, az, aw, at, aq}
{bi, bp, bw, cd, ck, -ce, -bx, -bq, -bj, -bh, -bo, -bv, -cc, -cj, cf, by, br, bk, bg, bn, bu, cb,
ci, -cg, -bz, -bs, -bl, -bf, -bm, -bt, -ca, -ch, ch, ca, bt, bm, bf, bl, bs, bz, cg, -ci, -cb, -bu, -bn,
-bg, -bk, -br, -by, -cf, cj, cc, bv, bo, bh, bj, bq, bx, ce, -ck, -cd, -bw, -bp, -bi}
{ad, ae, af, ag, -ag, -af, -ae, -ad, -ad, -ae, -af, -ag, ag, af, ae, ad, ad, ae, af, ag, -ag, -af,
-ae, -ad, -ad, -ae, -af, -ag, ag, af, ae, ad, ad, ae, af, ag, -ag, -af, -ae, -ad, -ad, -ae, -af, -ag, ag,
af, ae, ad, ad, ae, af, ag, -ag, -af, -ae, -ad, -ad, -ae, -af, -ag, ag, af, ae, ad}
{bj, bs, cb, ck, -cc, -bt, -bk, -bi, -br, -ca, -cj, cd, bu, bl, bh, bq, bz, ci, -ce, -bv, -bm, -bg,
-bp, -by, -ch, cf, bw, bn, bf, bo, bx, cg, -cg, -bx, -bo, -bf, -bn, -bw, -cf, ch, by, bp, bg, bm,
bv, ce, -ci, -bz, -bq, -bh, -bl, -bu, -cd, cj, ca, br, bi, bk, bt, cc, -ck, -cb, -bs, -bj}
{ar, aw, bb, -bd, -ay, -at, -ap, -au, -az, -be, ba, av, aq, as, ax, bc, -bc, -ax, -as, -aq, -av, -ba,
be, az, au, ap, at, ay, bd, -bb, -aw, -ar, -ar, -aw, -bb, bd, ay, at, ap, au, az, be, -ba, -av, -aq,
-as, -ax, -bc, bc, ax, as, aq, av, ba, -be, -az, -au, -ap, -at, -ay, -bd, bb, aw, ar}
{bk, bv, cg, -ce, -bt, -bi, -bm, -bx, -ci, cc, br, bg, bo, bz, ck, -ca, -bp, -bf, -bq, -cb, cj, by,
bn, bh, bs, cd, -ch, -bw, -bl, -bj, -bu, -cf, cf, bu, bj, bl, bw, ch, -cd, -bs, -bh, -bn, -by, -cj,
cb, bq, bf, bp, ca, -ck, -bz, -bo, -bg, -br, -cc, ci, bx, bm, bi, bt, ce, -cg, -bv, -bk}
{ai, al, ao, -am, -aj, -ah, -ak, -an, an, ak, ah, aj, am, -ao, -al, -ai, -ai, -al, -ao, am, aj, ah,
ak, an, -an, -ak, -ah, -aj, -am, ao, al, ai, ai, al, ao, -am, -aj, -ah, -ak, -an, an, ak, ah, aj, am,
-ao, -al, -ai, -ai, -al, -ao, am, aj, ah, ak, an, -an, -ak, -ah, -aj, -am, ao, al, ai}
{bl, by, -ck, -bx, -bk, -bm, -bz, cj, bw, bj, bn, ca, -ci, -bv, -bi, -bo, -cb, ch, bu, bh, bp, co,
-cg, -bt, -bg, -bq, -cd, cf, bs, bf, br, ce, -ce, -br, -bf, -bs, -cf, cd, bq, bg, bt, cg, -cc, -bp, -bh,
-bu, -ch, cb, bo, bi, bv, ci, -ca, -bn, -bj, -bw, -cj, bz, bm, bk, bx, ck, -by, -bl}
{as, az, -bd, -aw, -ap, -av, -be, ba, at, ar, ay, -be, -ax, -aq, -au, -bb, bb, au, aq, ax, be, -ay,
-ar, -at, -ba, be, av, ap, aw, bd, -az, -as, -as, -az, bd, aw, ap, aw, bd, -az, -as, -as, -az, bd, aw, ap, av, be, -ba, -at, -ar, -ay, be,
ax, aq, au, bb, -bb, -au, -aq, -ax, -be, ay, ar, at, ba, -be, -av, -ap, -aw, -bd, az, as}
{bm, cb, -cf, -bq, -bi, -bx, cj, bu, bf, bt, ci, -by, -bj, -bp, -ce, cc, bn, bl, ca, -cg, -br, -bh,
```

-continued

-bw, ck, bv, bg, bs, ch, -bz, -bk, -bo, -cd, cd, bo, bk, bz, -ch, -bs, -bg, -bv, -ck, bw, bh, br, cg, -ca, -bl, -bn, -cc, ce, bp, bj, by, -ci, -bt, -bf, -bu, -cj, bx, bi, bq, cf, -cb, -bm}
{ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab, ab, ac, -ac, -ab, -ab, -ac, ac, ab}
{bn, ce, -ca, -bj, -br, -ci, bw, bf, bv, -cj, -bs, -bi, -bz, cf, bo, bm, cd, -cb, -bk, -bq, -ch, bx, bg, bu, -ck, -bt, -bh, -by, cg, bp, bl, cc, -cc, -bl, -bp, -cg, by, bh, bt, ck, -bu, -bg, -bx, ch, bq, bk, cb, -cd, -bm, -bo, -cf, bz, bi, bs, cj, -bv, -bf, -bw, ci, br, bj, ca, -ce, -bn}
{at, be, -ay, -ap, -ax, bd, au, as, bb, -az, -aq, -aw, be, av, ar, ba, -ba, -ar, -av, -be, aw, aq, az, -bb, -as, -au, -bd, ax, ap, ay, -be, -at, -at, -be, ay, ap, ax, -bd, -au, -as, -bb, az, aq, aw, -be, -av, -ar, -ba, ba, ar, av, be, -aw, -aq, -az, bb, as, au, bd, -ax, -ap, -ay, be, at}
{bo, ch, -bv, -bh, -ca, cc, bj, bt, -cj, -bq, -bm, -cf, bx, bf, by, -ce, -bl, -br, -ck, bs, bk, cd, -bz, -bg, -bw, cg, bn, bp, ci, -bu, -bi, -cb, cb, bi, bu, -ci, -bp, -bn, -cg, bw, bg, bz, -cd, -bk, -bs, ck, br, bl, ce, -by, -bf, -bx, cf, bm, bq, cj, -bt, -bj, -cc, ca, bh, bv, -ch, -bo}
{aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj, aj, ao, -ak, -ai, -an, al, ah, am, -am, -ah, -al, an, ai, ak, -ao, -aj, -aj, -ao, ak, ai, an, -al, -ah, -am, am, ah, al, -an, -ai, -ak, ao, aj}
{bp, ck, -bq, -bo, -cj, br, bn, ci, -bs, -bm, -ch, bt, bl, cg, -bu, -bk, -cf, bv, bj, ce, -bw, -bi, -cd, bx, bh, cc, -by, -bg, -cb, bz, bf, ca, -ca, -bf, -bz, cb, bg, by, -cc, -bh, -bx, cd, bi, bw, -ce, -bj, -bv, cf, bk, bu, -cg, -bl, -bt, ch, bm, bs, -ci, -bn, -br, cj, bo, bq, -ck, -bp}
{au, -be, -at, -av, bd, as, aw, -be, -ar, -ax, bb, aq, ay, -ba, -ap, -az, az, ap, ba, -ay, -aq, -bb, ax, ar, be, -aw, -as, -bd, av, at, be, -au, -au, be, at, av, -bd, -as, -aw, be, ar, ax, -bb, -aq, -ay, ba, ap, az, -az, -ap, -ba, ay, aq, bb, -ax, -ar, -be, aw, as, bd, -av, -at, -be, au}
{bq, -ci, -bl, -bv, cd, bg, ca, -by, -bi, -cf, bt, bn, ck, -bo, -bs, cg, bj, bx, -cb, -bf, -cc, bw, bk, ch, -br, -bp, cj, bm, bu, -ce, -bh, -bz, bz, bh, ce, -bu, -bm, -cj, bp, br, -ch, -bk, -bw, cc, bf, cb, -bx, -bj, -cg, bs, bo, -ck, -bn, -bt, cf, bi, by, -ca, -bg, -cd, bv, bl, ci, -bq}
{ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae, ae, -ag, -ad, -af, af, ad, ag, -ae, -ae, ag, ad, af, -af, -ad, -ag, ae}
{br, -cf, -bg, -cc, bu, bo, -ci, -bj, -bz, bx, bl, ck, -bm, -bw, ca, bi, ch, -bp, -bt, cd, bf, ce, -bs, -bq, cg, bh, cb, -bv, -bn, cj, bk, by, -by, -bk, -cj, bn, bv, -cb, -bh, -cg, bq, bs, -ce, -bf, -cd, bt, bp, -ch, -bi, -ca, bw, bm, -ck, -bl, -bx, bz, bj, ci, -bo, -bu, cc, bg, cf, -br}
{av, -bb, -ap, -be, au, aw, -ba, -aq, -bd, at, ax, -az, -ar, -be, as, ay, -ay, -as, be, ar, az, -ax, -at, bd, aq, ba, -aw, -au, be, ap, bb, -av, -av, bb, ap, be, -au, -aw, ba, aq, bd, -at, -ax, az, ar, be, -as, -ay, ay, as, -be, -ar, -az, ax, at, -bd, -aq, -ba, aw, au, -be, -ap, -bb, av}
{bs, -cc, -bi, -cj, bl, bz, -bv, -bp, cf, bf, cg, -bo, -bw, by, bm, -ci, -bh, -cd, br, bt, -cb, -bj, -ck, bk, ca, -bu, -bq, ce, bg, ch, -bn, -bx, bx, bn, -ch, -bg, -ce, bq, bu, -ca, -bk, ck, bj, cb, -bt, -br, cd, bh, ci, -bm, -by, bw, bo, -cg, -bf, -cf, bp, bv, -bz, -bl, cj, bi, cc, -bs}
{ak, -am, -ai, ao, all, an, -aj, -al, al, aj, -an, -ah, -ao, ai, am, -ak, am, ai, -ao, -ah, -an, aj, al, -al, -aj, an, ah, ao, -ai, -am, ak, ak, -am, -ai, ao, ah, an, -aj, -al, al, aj, -an, -ah, -ao, ai, am, -ak, am, ai, -ao, -ah, -an, aj, al, -al, -aj, an, ah, ao, -ai, -am, ak}
{bt, -bz, -bn, cf, bh, ck, -bi, -ce, bo, by, -bu, -bs, ca, bm, -cg, -bg, -cj, bj, cd, -bp, -bx, bv, br, -cb, -bl, ch, bf, ci, -bk, -cc, bq, bw, -bw, -bq, cc, bk, -ci, -bf, -ch, bl, cb, -br, -bv, bx, bp, -cd, -bj, cj, bg, cg, -bm, -ca, bs, bu, -by, -bo, ce, bi, -ck, -bh, -cf, bn, bz, -bt}
{aw, -ay, -au, ba, as, -be, -aq, be, ap, bd, -ar, -bb, at, az, -av, -ax, ax, av, -az, -at, bb, ar, -bd, -ap, -be, aq, be, -as, -ba, au, ay, -aw, -aw, ay, au, -ba, -as, be, aq, -be, -ap, -bd, ar, bb, -at, -az, av, ax, -ax, -av, az, at, -bb, -ar, bd, ap, be, -aq, -be, as, ba, -au, -ay, aw}
{bu, -bw, -bs, by, bq, -ca, -bo, cc, bm, -ce, -bk, cg, bi, -ci, -bg, ck, bf, cj, -bh, -ch, bj, cf, -bl, -cd, bn, cb, -bp, -bz, br, bx, -bt, -bv, bv, bt, -bx, -br, bz, bp, -cb, -bn, cd, bl, -cf, -bj, ch, bh, -cj, -bf, -ck, bg, ci, -bi, -cg, bk, ce, -bm, -cc, bo, ca, -bq, -by, bs, bw, -bu}
{aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa, aa, -aa, -aa, aa}
{bv, -bt, -bx, br, bz, -bp, -cb, bn, cd, -bl, -cf, bj, ch, -bh, -cj, bf, -ck, -bg, ci, bi, -cg, -bk, ce, bm, -cc, -bo, ca, bq, -by, -bs, bw, bu, -bu, -bw, bs, by, -bq, -ca, bo, cc, -bm, -ce, bk, cg, -bi, -ci, bg, ck, -bf, cj, bh, -ch, -bj, cf, bl, -cd, -bn, cb, bp, -bz, -br, bx, bt, -bv}
{ax, -av, -az, at, bb, -ar, -bd, ap, -be, -aq, be, as, -ba, -au, ay, aw, -aw, -ay, au, ba, -as, -be, aq, be, -ap, bd, ar, -bb, -at, az, av, -ax, -ax, av, az, -at, -bb, ar, bd, -ap, be, aq, -be, -as, ba, au, -ay, -aw, aw, ay, -au, -ba, as, be, -aq, -be, ap, -bd, -ar, bb, at, -az, -av, ax}
{bw, -bq, -cc, bk, ci, -bf, ch, bl, -cb, -br, bv, bx, -bp, -cd, bj, cj, -bg, cg, bm, -ca, -bs, bu, by, -bo, -ce, bi, ck, -bh, cf, bn, -bz, -bt, bt, bz, -bn, -cf, bh, -ck, -bi, ce, bo, -by, -bu, bs, ca, -bm, -cg, bg, -cj, -bj, cd, bp, -bv, -bx, br, cb, -bl, -ch, bf, -ci, -bk, cc, bq, -bw}
{al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al, al, -aj, -an, ah, -ao, -ai, am, ak, -ak, -am, ai, ao, -ah, an, aj, -al, -al, aj, an, -ah, ao, ai, -am, -ak, ak, am, -ai, -ao, ah, -an, -aj, al}
{bx, -bn, -ch, bg, -ce, -bq, bu, ca, -bk, -ck, bj, -cb, -bt, br, cd, -bh, ci, bm, -by, -bw, bo, cg, -bf, cf, bp, -bv, -bz, bl, cj, -bi, cc, bs, -bs, -cc, bi, -cj, -bl, bz, bv, -bp, -cf, bf, -cg, -bo, bw, by, -bm, -ci, bh, -cd, -br, bt, cb, -bj, ck, bk, -ca, -bu, bq, ce, -bg, ch, bn, -bx}
{ay, -as, -be, ar, -az, -ax, at, bd, aq, ba, aw, -au, -be, ap, -bb, -av, av, bb, -ap, be, au, -aw, -ba, -aq, -bd, -at, ax, az, -ar, be, as, -ay, -ay, as, -be, -ar, az, ax, -at, -bd, -aq, -ba, -aw, au, be, -ap, bb, av, -av, -bb, ap, -be, -au, aw, ba, aq, bd, at, -ax, -az, ar, -be, -as, ay}
{by, -bk, cj, bn, -bv, -cb, bh, -cg, -bq, bs, ce, -bf, cd, bt, -bp, -ch, bi, -ca, -bw, bm, ck, -bl, bx, bz, -bj, ci, bo, -bu, -cc, bg, -cf, -br, br, cf, -bg, cc, bu, -bo, -ci, bj, -bz, -bx, bl, -ck, -bm, bw, ca, -bi, ch, bp, -bt, -cd, bf, -ce, -bs, bq, cg, -bh, cb, bv, -bn, -cj, bk, -by}
{af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af, af, -ad, ag, ae, -ae, -ag, ad, -af, -af, ad, -ag, -ae, ae, ag, -ad, af}
{bz, -bh, ce, bu, -bm, cj, bp, -br, -ch, bk, -bw, -cc, bf, -cb, -bx, bj, -cg, -bs, bo, ck, -bn, bt, cf, -bi, by, ca, -bg, cd, bv, -bl, ci, bq, -bq, -ci, bl, -bv, -cd, bg, -ca, -by, bi, -cf, -bt, bn, -ck, -bo, bs, cg, -bj, bx, cb, -bf, cc, bw, -bk, ch, br, -bp, -cj, bm, -bu, -ce, bh, -bz}
{az, -ap, ba, ay, -aq, bb, ax, -ar, be, aw, -as, bd, av, -at, be, au, -au, -be, at, -av, -bd, as,
-aw, -be, ar, -ax, -bb, aq, -ay, -ba, ap, -az, -az, ap, -ba, -ay, aq, -bb, -ax, ar, -be, -aw, as, -bd,
-av, at, -be, -au, au, be, -at, av, bd, -as, aw, be, -ar, ax, bb, -aq, ay, ba, -ap, az}
{ca, -bf, bz, cb, -bg, by, cc, -bh, bx, cd, -bi, bw, ce, -bj, bv, cf, -bk, bu, cg, -bl, bt, ch,
-bm, bs, ci, -bn, br, cj, -bo, bq, ck, -bp, bp, -ck, -bq, bo, -cj, -br, bn, -ci, -bs, bm, -ch, -bt, bl,
-cg, -bu, bk, -cf, -bv, bj, -ce, -bw, bi, -cd, -bx, bh, -cc, -by, bg, -cb, -bz, bf, -ca}
{am, -ah, al, an, -ai, ak, ao, -aj, aj, -ao, -ak, ai, -an, -al, ah, -am, -am, ah, -al, -an, ai, -ak,
-ao, aj, -aj, ao, ak, -ai, an, al, -ah, am, am, -ah, al, an, -ai, ak, ao, -aj, aj, -ao, -ak, ai, -an,
-al, ah, -am, -am, ah, -al, -an, ai, -ak, -ao, aj, -aj, ao, ak, -ai, an, al, -ah, am}
{cb, -bi, bu, ci, -bp, bn, -cg, -bw, bg, -bz, -cd, bk, -bs, -ck, br, -bl, ce, by, -bf, bx, cf, -bm,
bq, -cj, -bt, bj, -cc, -ca, bh, -bv, -ch, bo, -bo, ch, bv, -bh, ca, cc, -bj, bt, cj, -bq, bm, -cf, -bx,
bf, -by, -ce, bl, -br, ck, bs, -bk, cd, bz, -bg, bw, cg, -bn, bp, -ci, -bu, bi, -cb}
{ba, -ar, av, -be, -aw, aq, -az, -bb, as, -au, bd, ax, -ap, ay, be, -at, at, -be, -ay, ap, -ax, -bd,
au, -as, bb, az, -aq, aw, be, -av, ar, -ba, -ba, ar, -av, be, aw, -aq, az, bb, -as, au, -bd, -ax,
ap, -ay, -be, at, -at, be, ay, -ap, ax, bd, -au, as, -bb, -az, aq, -aw, -be, av, -ar, ba}
{cc, -bl, bp, -cg, -by, bh, -bt, ck, bu, -bg, bx, ch, -bq, bk, -cb, -cd, bm, -bo, cf, bz, -bi, bs,
-cj, -bv, bf, -bw, -ci, br, -bj, ca, ce, -bn, bn, -ce, -ca, bj, -br, ci, bw, -bf, bv, cj, -bs, bi, -bz,
-cf, bo, -bm, cd, cb, -bk, bq, -ch, -bx, bg, -bu, -ck, bt, -bh, by, cg, -bp, bl, -cc}
{ac, -ab, ab, -ac, -ac, ab, -ab, ac, ac, -ab, ab, -ac, -ac, ab, -ab, ac, ac, -ab, ab, -ac, -ac, ab,
-ab, ac, ac, -ab, ab, -ac, -ac, ab, -ab, ac, ac, -ab, ab, -ac, -ac, ab, -ab, ac, ac, -ab, ab, -ac, -ac,
ab, -ab, ac, ac, -ab, ab, -ac, -ac, ab, -ab, ac, ac, -ab, ab, -ac, -ac, ab, -ab, ac}
{cd, -bo, bk, -bz, -ch, bs, -bg, bv, -ck, -bw, bh, -br, cg, ca, -bl, bn, -cc, -ce, bp, -bj, by, ci,
-bt, bf, -bu, cj, bx, -bi, bq, -cf, -cb, bm, -bm, cb, cf, -bq, bi, -bx, -cj, bu, -bf, bt, -ci, -by, bj,
-bp, ce, cc, -bn, bl, -ca, -cg, br, -bh, bw, ck, -bv, bg, -bs, ch, bz, -bk, bo, -cd}
{bb, -au, aq, -ax, be, ay, -ar, at, -ba, -bc, av, -ap, aw, -bd, -az, as, -as, az, bd, -aw, ap, -av,
bc, ba, -at, ar, -ay, -be, ax, -aq, au, -bb, -bb, au, -aq, ax, -be, -ay, ar, -at, ba, bc, -av, ap,
-aw, bd, az, -as, as, -az, -bd, aw, -ap, av, -bc, -ba, at, -ar, ay, be, -ax, aq, -au, bb}
{ce, -br, bf, -bs, cf, cd, -bq, bg, -bt, cg, cc, -bp, bh, -bu, ch, cb, -bo, bi, -bv, ci, ca, -bn,
bj, -bw, cj, bz, -bm, bk, -bx, ck, by, -bl, bl, -by, -ck, bx, -bk, bm, -bz, -cj, bw, -bj, bn, -ca,
-ci, bv, -bi, bo, -cb, -ch, bu, -bh, bp, -cc, -cg, bt, -bg, bq, -cd, -cf, bs, -bf, br, -ce}
{an, -ak, ah, -aj, am, ao, -al, ai, -ai, al, -ao, -am, aj, -ah, ak, -an, -an, ak, -ah, aj, -am, -ao,
al, -ai, ai, -al, ao, am, -aj, ah, -ak, an, an, -ak, ah, -aj, am, ao, -al, ai, -ai, al, -ao, -am, aj,
-ah, ak, -an, -an, ak, -ah, aj, -am, -ao, al, -ai, ai, -al, ao, am, -aj, ah, -ak, an}
{cf, -bu, bj, -bl, bw, -ch, -cd, bs, -bh, bn, -by, cj, cb, -bq, bf, -bp, ca, ck, -bz, bo, -bg, br,
-cc, -ci, bx, -bm, bi, -bt, ce, cg, -bv, bk, -bk, bv, -cg, -ce, bt, -bi, bm, -bx, ci, cc, -br, bg,
-bo, bz, -ck, -ca, bp, -bf, bq, -cb, -cj, by, -bn, bh, -bs, cd, ch, -bw, bl, -bj, bu, -cf}
{bc, -ax, as, -aq, av, -ba, -be, az, -au, ap, -at, ay, -bd, -bb, aw, -ar, ar, -aw, bb, bd, -ay, at,
-ap, au, -az, be, ba, -av, aq, -as, ax, -be, -be, ax, -as, aq, -av, ba, be, -az, au, -ap, at, -ay,
bd, bb, -aw, ar, -ar, aw, -bb, -bd, ay, -at, ap, -au, az, -be, -ba, av, -aq, as, -ax, be}
{cg, -bx, bo, -bf, bn, -bw, cf, ch, -by, bp, -bg, bm, -bv, ce, ci, -bz, bq, -bh, bl, -bu, cd, cj,
-ca, br, -bi, bk, -bt, cc, ck, -cb, bs, -bj, bj, -bs, cb, -ck, -cc, bt, -bk, bi, -br, ca, -cj, -cd, bu,
-bl, bh, -bq, bz, -ci, -ce, bv, -bm, bg, -bp, by, -ch, -cf, bw, -bn, bf, -bo, bx, -cg}
{ag, -af, ae, -ad, ad, -ae, af, -ag, -ag, af, -ae, ad, -ad, ae, -af, ag, ag, -af, ae, -ad, ad, -ae,
af, -ag, -ag, af, -ae, ad, -ad, ae, -af, ag, ag, -af, ae, -ad, ad, -ae, af, -ag, -ag, af, -ae, ad, -ad,
ae, -af, ag, ag, -af, ae, -ad, ad, -ae, af, -ag, -ag, af, -ae, ad, -ad, ae, -af, ag}
{ch, -ca, bt, -bm, bf, -bl, bs, -bz, cg, ci, -cb, bu, -bn, bg, -bk, br, -by, cf, cj, -cc, bv, -bo,
bh, -bj, bq, -bx, ce, ck, -cd, bw, -bp, bi, -bi, bp, -bw, cd, -ck, -ce, bx, -bq, bj, -bh, bo, -bv,
cc, -cj, -cf, by, -br, bk, -bg, bn, -bu, cb, -ci, -cg, bz, -bs, bl, -bf, bm, -bt, ca, -ch}
{bd, -ba, ax, -au, ar, -ap, as, -av, ay, -bb, be, bc, -az, aw, -at, aq, -aq, at, -aw, az, -bc, -be,
bb, -ay, av, -as, ap, -ar, au, -ax, ba, -bd, -bd, ba, -ax, au, -ar, ap, -as, av, -ay, bb, -be, -bc,
az, -aw, at, -aq, aq, -at, aw, -az, bc, be, -bb, ay, -av, as, -ap, ar, -au, ax, -ba, bd}
{ci, -cd, by, -bt, bo, -bj, bf, -bk, bp, -bu, bz, -ce, cj, ch, -cc, bx, -bs, bn, -bi, bg, -bl, bq,
-bv, ca, -cf, ck, cg, -cb, bw, -br, bm, -bh, bh, -bm, br, -bw, cb, -cg, -ck, cf, -ca, bv, -bq, bl,
-bg, bi, -bn, bs, -bx, cc, -ch, -cj, ce, -bz, bu, -bp, bk, -bf, bj, -bo, bt, -by, cd, -ci}
{ao, -an, am, -al, ak, -aj, ai, -ah, ah, -ai, aj, -ak, al, -am, an, -ao, -ao, an, -am, al, -ak, aj,
-ai, ah, -ah, ai, -aj, ak, -al, am, -an, ao, ao, -an, am, -al, ak, -aj, ai, -ah, ah, -ai, aj, -ak, al,
-am, an, -ao, -ao, an, -am, al, -ak, aj, -ai, ah, -ah, ai, -aj, ak, -al, am, -an, ao}
{cj, -cg, cd, -ca, bx, -bu, br, -bo, bl, -bi, bf, -bh, bk, -bn, bq, -bt, bw, -bz, cc, -cf, ci, ck,
-ch, ce, -cb, by, -bv, bs, -bp, bm, -bj, bg, -bm, bp, -bs, bv, -by, cb, -ce, ch, -ck, -ci,
cf, -cc, bz, -bw, bt, -bq, bn, -bk, bh, -bf, bi, -bl, bo, -br, bu, -bx, ca, -cd, cg, -cj}
{be, -bd, bc, -bb, ba, -az, ay, -ax, aw, -av, au, -at, as, -ar, aq, -ap, ap, -aq, ar, -as, at, -au,
av, -aw, ax, -ay, az, -ba, bb, -bc, bd, -be, -be, bd, -bc, bb, -ba, az, -ay, ax, -aw, av, -au, at,
-as, ar, -aq, ap, -ap, aq, -ar, as, -at, au, -av, aw, -ax, ay, -az, ba, -bb, bc, -bd, be}
{ck, -cj, ci, -ch, cg, -cf, ce, -cd, cc, -cb, ca, -bz, by, -bx, bw, -bv, bu, -bt, bs, -br, bq, -bp,
bo, -bn, bm, -bl, bk, -bj, bi, -bh, bg, -bf, bf, -bg, bh, -bi, bj, -bk, bl, -bm, bn, -bo, bp, -bq,
br, -bs, bt, -bu, bv, -bw, bx, -by, bz, -ca, cb, -cc, cd, -ce, cf, -cg, ch, -ci, cj, -ck}
}
where
{aa, ab, ac, ad, ae, af, ag, ah, ai, aj, ak, al, am, an, ao, ap, aq, ar, as, at, au, av, aw, ax, ay, az, ba,
bb, bc, bd, be, bf, bg, bh, bi, bj, bk, bl, bm, bn, bo, bp, bq, br, bs, bt, bu, bv, bw, bx, by, bz, ca,
cb, cc, cd, ce, cf, eg, ch, ci, cj, ck} =
{64, 83, 36, 89, 75, 50, 18, 90, 87, 80, 70, 57, 43, 25, 9, 90, 90, 88, 85, 82, 78, 73, 67, 61, 54, 46, 38, 31, 22, 13, 4, 91,
90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}

In addition to DCT-2 and 4×4 DST-7 which have been employed in HEVC, an Adaptive Multiple Transform (AMT, Enhanced Multiple Transform (EMT), or Multiple Transform Selection (MTS)) scheme has been used in VVC for residual coding for both inter and intra coded blocks. The MTS can use multiple selected transforms from the DCT/DST families other than the current transforms in HEVC. The newly introduced transform matrices are DST-7, DCT-8. Table 1 shows the basic functions of the selected DST/DCT.

TABLE 1

Transform basis functions of DCT-2, DST-7 and DCT-8 for N-point input

| Transform Type | Basis function $T_i(j)$, $i, j = 0, 1, \ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

The primary transform matrices in VVC are used with 8-bit representation. The AMT applies to the CUs with both width and height smaller than or equal to 32, and whether applying AMT or not can be controlled by a flag called mts_flag. When the mts_flag is equal to 0, only DCT-2 is applied for coding the residue. When the mts_flag is equal to 1, an index mts_idx is further signaled using 2 bins to specify the horizontal and vertical transform to be used according to Table 2, where value 1 means using DST-7 and value 2 means using DCT-8.

TABLE 2

Specification of trTypeHor and trTypeVer depending on mts_idx[ x ][ y ][ cIdx ]

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

The transform core, which is a matrix composed by the basis vectors, of DST-7 can also be represented below:

4-point DST-7:

{a, b, c, d}
{c, c, 0, -c}
{d, -a, -c, b}
{b, -d, c, -a}
where {a, b, c, d} = {29, 55, 74, 84}.

8-point DST-7:

{a, b, c, d, e, f, g, h,}
{c, f, h, e, b, -a, -d, -g,}
{e, g, b, -c, -h, -d, a, f,}
{g, c, -d, -f a, h, b, -e,}
{h, -a, -g, b, f, -c, -e, d,}
{f, -e, -a, g, -d, -b, h, -c,}
{d, -h, e, -a, -c, g, -f, b,}
{b, -d, f, -h, g, -e, c, -a,}
where {a, b, c, d, e, f, g, h} = {17, 32, 46, 60, 71, 78, 85, 86}.

16-point DST-7:

{a, b, c, d, e, f, g, h, i, j, k, l, m, n, o, p,}
{c, f, i, l, o, o, l, i, f, c, 0, -c, -f, -i, -l, -o,}
{e, j, o, m, h, c, -b, -g, -l, -p, -k, -f -a, d, i, n,}
{g, n, l, e, -b, -i, -p, -j, -c, d, k, o, h, a, -f, -m,}
{i, o, f, -c, -l, -l, -c, f, o, i, 0, -i, -o, -f, c, l,}
{k, k, 0, -k, -k, 0, k, k, 0, -k, -k, 0, k, k, 0, -k,}
{m, g, -f, -n, -a, l, h, -e, -o, -b, k, i, -d, -p, -c, j,}
{o, c, -l, -f, i, i, -f, -l, c, o, 0, -o, -c, l, f, -i,}
{p, -a, -o, b, n, -c, -m, d, l, -e, -k, f, j, -g, -i, h,}
{n, -e, -i, j, d, -o, a, m, -f, -h, k, c, -p, b, l, -g,}
{i, -i, -c, o, -f, -f, o, -c, -i, l, 0, -l, i, c, -o, f,}
{j, -m, c, g, -p, f, d, -n, i, a, -k, l, -b, -h, o, -e,}
{h, -p, i, -a, -g, o, -j, b, f, -n, k, -c, -e, m, -l, d,}
{f, -l, o, -i, c, c, -i, o, -l, f, 0, -f, l, -o, i, -c,}
{d, -h, l, -p, m, -i, e, -a, -c, g, -k, o, -n, j, -f, b,}
{b, -d, f, -h, j, -l, n, -p, o, -m, k, -i, g, -e, c, -a,}
where {a, b, c, d, e, f, g, h, i, j, k, l, m, n, o, p} = {9, 17, 25, 33, 41, 49, 56, 62, 66, 72, 77, 81, 83, 87, 89, 90}.

-continued 32-point DST-7:

{a, b, c, d, e, f, g, h, i, j, k, l, m, n, o, p, q, r, s, t, u, v, w, x, y, z, A, B, C, D, E, F,}
{c, f, i, l, o, r, u, x, A, D, F, C, z, w, t, q, n, k, h, e, b, -a, -d, -g, -j, -m, -p, -s, -v, -y, -B, -E,}
{e, j, o, t, y, D, D, y, t, o, j, e, 0, -e, -j, -o, -t, -y, -D, -D, -y, -t, -o, -j, -e, 0, e, j, o, t, y, D,}
{g, n, u, B, D, w, p, i, b, -e, -l, -s, -z, -F, -y, -r, -k, -d, c, j, q, x, E, A, t, m, f, -a, -h, -o, -v, -C,}
{i, r, A, C, t, k, b, -g, -p, -y, -E, -v, -m, -d, e, n, w, F, x, o, f, -c, -l, -u, -D, -z, -q, -h, a, j, s, B,}
{k, v, F, u, j, -a, -l, -w, -E, -t, -i, b, m, x, D, s, h, -c, -n, -y, -C, -r, -g, d, o, z, B, q, f, -e, -p, -A,}
{m, z, z, m, 0, -m, -z, -z, -m, 0, m, z, z, m, 0, -m, -z, -z, -m, 0, 0, z, z, m, 0, -m, -z, -z, -m, 0, m, z,}
{o, D, t, e, -j, -y, -y, -j, e, t, D, o, 0, -o, -D, -t, -e, j, y, y, j, -e, -t, -D, -o, 0, o, D, t, e, -j, -y,}
{q, E, n, -c, -t, -B, -k, f, w, y, h, -i, -z, -v, -e, l, C, s, b, -o, -F, -p, a, r, D, tn, -d, -u, -A, -j, g, x,}
{s, A, h, -k, -D, -p, c, v, x, e, -n, -F, -m, f, y, u, b, -q, -C, -j, i, B, r, -a, -t, -z, -g, l, E, o, -d, -w,}
{u, w, b, -s, -y, -d, q, A, f, -o, -C, -h, m, E, j, -k, -F, -l, i, D, n, -g, -B, -p, e, z, r, -c, -x, -t, a, v,}
{w, s, -d, -A, -o, h, E, k, -l, -D, -g, p, z, c, -t, -v, a, x, r, -e, -B, -n, i, F, j, -m, -C, -f, q, y, b, -u,}
{y, o, -j, -D, -e, t, t, -e, -D, -j, o, y, 0, -y, -o, j, D, e, -t, -t, e, D, j, -o, -y, 0, y, o, -j, -D, -e, t,}
{A, k, -p, -v, e, F, f, -u, -q, j, B, a, -z, -l, o, w, -d, -E, -g, t, r, -i, -C, -b, y, m, -n, -x, c, D, h, -s,}
{C, g, -v, -n, o, u, -h, -B, a, D, f, -w, -m, p, t, -i, -A, b, E, e, -x, -l, q, s, -j, -z, c, F, d, -y, -k, r,}
{E, c, -B, -f, y, i, -v, -l, s, o, -p, -r, m, u, -j, -x, g, A, -d, -D, a, F, b, -C, -e, z, h, -w, -k, t, n, -q,}
{F, -a, -E, b, D, -c, -C, d, B, -e, -A, f, z, -g, -y, h, x, -i, -w, j, v, -k, -u, l, t, -m, -s, n, r, -o, -q, p,}
{D, -e, -y, j, t, -o, -o, t, j, -v, -e, D, 0, -D, e, y, -j, -t, o, o, -t, -j, y, e, -D, 0, D, -e, -y, j, t, -o,}
{B, -i, -s, r, j, -A, -a, C, -h, -t, q, k, -z, -b, D, -g, -u, p, l, -y, -c, E, -f, -v, o, m, -x, -d, F, -e, -w, n,}
{z, -m, -m, z, 0, -z, m, m, -z, 0, z, -m, -m, z, 0, -z, m, m, -z, 0, z, -m, -m, z, 0, -z, m, m, -z, 0, z, -m,}
{x, -q, -g, E, -j, -n, A, -c, -u, t, d, -B, m, k, -D, f, r, -w, -a, y, -p, -h, F, -i, -o, z, -b, -v, s, e, -C, l,}
{v, -u, -a, w, -t, -b, x, -s, -c, y, -r, -d, z, -q, -e, A, -p, -f, B, -o, -g, C, -n, -h, D, -m, -i, E, -l, -j, F, -k,}
{t, -y, e, o, -D, j, j, -D, o, e, -y, t, 0, -t, y, -e, -o, D, -j, -j, D, -o, -e, y, -t, 0, t, -y, e, o, -D, j,}
{r, -C, k, g, -y, v, -d, -n, F, -o, -c, u, -z, h, j, -B, s, -a, -q, D, -l, -f, x, -w, e, m, -E, p, b, -t, A, -i,}
{p, -F, q, -a, -o, E, -r, b, n, -D, s, -c, -m, C, -t, d, l, -B, u, -e, -k, A, -v, f, j, -z, w, -g, -i, y, -x, h,}
{n, -B, w, -i, -e, s, -F, r, -d, -j, x, -A, m, a, -o, C, -v, h, f, -t, E, -q, c, k, -y, z, -l, -b, p, -D, u, -g,}
{l, -x, C, -q, e, g, -s, E, -v, j, b, -n, z, -A, o, -c, -i, u, -F, t, -h, -d, p, -B, y, -m, a, k, -w, D, -r, f,}
{j, -t, D, -y, o, -e, -e, o, -y, D, -t, j, 0, -j, t, -D, y, -o, e, e, -o, y, -D, t, -j, 0, j, -t, D, -y, o, -e,}
{h, -p, x, -F, y, -q, i, -a, -g, o, -w, E, -z, r, -j, b, f, -n, v, -D, A, -s, k, -c, -e, m, -u, C, -B, t, -l, d,}
{f, -l, r, -x, D, -C, w, -q, k, -e, -a, g, -m, s, -y, E, -B, v, -p, j, -d, -b, h, -n, t, -z, F, -A, u, -o, i, -c,}
{d, -h, l, -p, t, -x, B, -F, C, -y, u, -q, m, -i, e, -a, -c, g, -k, o, -s, w, -A, E, -D, z, -v, r, -n, j, -f, b,}
{b, -d, f, -h, j, -l, n, -p, r, -t, v, -x, z, -B, D, -F, E, -C, A, -v, w, -u, s, -q, o, -m, k, -i, g, -e, c, -a,}
where {a, b, c, d, e, f, g, h, i, j, k, l, m, n, o, p, q, r, s, t, u, v, w, x, y, z, A, B, C, D, E, F} = {4, 9, 13, 17, 21, 26, 30, 34, 38, 42, 45, 50, 53, 56, 60, 63, 66, 68, 72, 74, 77, 78, 80, 82, 84, 85, 86, 88, 88, 89, 90, 90}.

4-point DCT-8:

{a, b, c, d,}
{b, 0, -b, -b,}
{c, -b, -d, a,}
{d, -b, a, -c,}
where {a, b, c, d} = {84, 74, 55, 29}.

8-point DCT-8:

{a, b, c, d, e, f, g, h,}
{b, e, h, -g, -d, -a, -c, -f,}
{c, h, -e, -a, -f, g, b, d,}
{d, -g, -a, -h, c, e, -f, -b,}

-continued

{e, -d, -f, c, g, -b, -h, a,}
{f, -a, g, e, -b, h, d, -c,}
{g, -c, b, -f, -h, d, -a, e,}
{h, -f, d, -b, a, -c, e, -g,}
where {a, b, c, d, e, f, g, h} = {86, 85, 78, 71, 60, 46, 32, 17}.
16-point DCT-8:

{a, b, c, d, e, f, g, h, i, j, k, l, m, n, o, p,}
{b, e, h, k, n, 0, -n, -k, -h, -e, -b, -b, -e, -h, -k, -n,}
{c, h, m, -p, -k, -f, -a, -e, -j, -o, n, i, d, b, g, l,}
{d, k, -p, -i, -b, -f, -m, n, g, a, h, o, -l, -e, -c, -j,}
{e, n, -k, -b, -h, 0, h, b, k, -n, -e, -e, -n, k, b, h,}
{f, 0, -f, -f, 0, f, f, 0, -f, -f, 0, f, f, 0, -f, -f,}
{g, -n, -a, -m, h, f, -o, -b, -l, i, e, -p, -c, -k, j, d,}
{h, -k, -e, n, b, 0, -b, -n, e, k, -h, -h, k, e, -n, -b,}
{i, -h, -j, g, k, -f, -l, e, m, -d, -n, c, o, -b, -p, a,}
{j, -e, -o, a, -n, -f, i, k, -d, -p, b, -m, -g, h, l, -c,}
{k, -b, n, h, -e, 0, e, -h, -n, b, -k, -k, b, -n, -h, e,}
{l, -b, i, o, -e, f, -p, -h, c, -m, -k, a, -j, -n, d, -g,}
{m, -e, d, -l, -n, f, -c, k, o, -g, b, -j, -p, h, -a, i,}
{n, -h, b, -e, k, 0, -k, e, -b, h, -n, -n, h, -b, e, -k,}
{o, -k, g, -c, b, -f, j, -e, -p, l, -h, d, -a, e, -i, m,}
{p, -n, l, -j, h, -f, d, -b, a, -c, e, -g, i, -k, m, -o,}
where {a, b, c, d, e, f, g, h, i, j, k, l, m, n, o, p} = {90, 89, 87, 83, 81, 77, 72, 66, 62, 56, 49, 41, 33, 25, 17, 9}.
32-point DCT-8:

{a, b, c, d, e, f, g, h, i, j, k, l, m, n, o, p, q, r, s, t, u, v, w, x, y, z, A, B, C, D, E, F,}
{b, e, h, k, n, q, t, w, z, C, F, -E, -B, -y, -v, -s, -p, -m, -j, -g, -d, -a, -c, -f, -i, -l, -o, -r, -u, -x, -A, -D,}
{c, h, m, r, w, B, 0, -B, -w, -r, -m, -h, -c, -c, -h, -m, -r, -w, -B, 0, B, w, r, m, h, c, c, h, m, r, w, B,}
{d, k, r, y, F, -A, -y -m, -f, -b, -i, -p, -w, -D, C, v, o, h, a, g, n, u, B, -E, -x, -q, -j, -c, -e, -l, -s, -z,}
{e, n, w, F, -y, -p, -g, -c, -l, -u, -D, A, r, i, a, j, s, B, -C, -t, -k, -b, -h, -q, -z, E, v, m, d, f, o, x,}
{f, q, B, -A, -p, -e, -g, -r, -C, z, o, d, h, s, D, -y, -n, -c, -i, -t, -E, x, m, b, j, u, F, -w, -l, -a, -k, -v,}
{g, t, 0, -t, -g, -g, -t, 0, t, g, g, t, 0, -t, -g, -g, -t, 0, t, g, g, t, 0, -t, -g, -g, -t, 0, t, g, g, t,}
{h, w, -B, -m, -c, -r, 0, r, c, m, B, -w, -h, -h, -w, B, m, c, r, 0, -r, -c, -m, -B, w, h, h, w, -B, -m, -c, -r,}
{i, z, -w, -f, -l, -C, t, c, o, F, -q, -a, -r, E, n, d, u, -B, -k, -g, -x, y, h, j, A, -v, -e, -m, -D, s, b, p,}
{j, C, -r, -b, -u, z, g, m, F, -o, -e, -x, w, d, p, -E, -l, -h, -A, t, a, s, -B, -i, -k, -D, q, c, v, -y, -f, -n,}
{k, F, -m, -i, -D, o, g, B, -q, -e, -z, s, c, x, -u, -a, -v, w, b, t, -y, -d, -r, A, f, p, -C, -h, -n, E, j, l,}
{l, -E, -h, -p, A, d, t, -w, -a, -x, s, e, B, -o, -i, -F, k, m, -D, -g, -q, z, c, u, -v, -b, -y, r, f, C, -n, -j,}
{m, -B, -c, -w, r, h, 0, -h, -r, w, c, B, -m, -m, B, c, w, -r, -h, 0, h, r, -w, -c, -B, m, m, -B, -c, -w, r, h,}
{n, -y, -c, -D, i, s, -t, -h, E, d, x, -o, -m, z, b, C, -j, -r, u, g, -F, -e, -w, p, l, -A, -a, -B, k, q, -v, -f,}
{o, -v, -h, C, a, D, -g, -w, n, p, -u, -i, B, b, E, -f, -x, m, q, -t, -j, A, c, F, -e, -y, l, r, -s, -k, z, d,}
{p, -s, -m, v, j, -y, -g, B, d, -E, -a, -F, c, C, -f, -z, i, w, -l, -t, o, q, -r, -n, u, k, -x, -h, A, e, -D, -b,}
{q, -p, -r, o, s, -n, -t, m, u, -l, -v, k, w, -j, -x, i, y, -h, -z, g, A, -f, -B, e, C, -d, -D, c, E, -b, -F, a,}
{r, -m, -w, h, B, -c, 0, c, -B, -h, w, m, -r, -r, m, w, -h, -B, c, 0, -c, B, h, -w, -m, r, r, -m, -w, h, B, -c,}
{s, -j, -B, a, -C, -i, t, r, -k, -A, b, -D, -h, u, q, -l, -z, c, -E, -g, v, p, -m, -y, d, -F, -f, w, o, -n, -x, e,}
{t, -g, 0, g, -t, -t, g, 0, -g, t, t, -g, 0, g, -t, -t, g, 0, -g, t, t, -g, 0, g, -t, -t, g, 0, -g, t, t, -g,}
{u, -d, B, n, -k, -E, g, -r, -x, a, -y, -q, h, -F, -j, o, A, -c, v, t, -e, C, m, -l, -D, f, -s, -w, b, -z, -p, i,}
{v, -a, w, u, -b, x, t, -c, y, s, -d, z, r, -e, A, q, -f, B, p, -g, C, o, -h, D, n, -i, E, m, -j, F, l, -k,}
{w, -c, r, B, -h, m, 0, -m, h, -B, -r, c, -w, -w, c, -r, -B, h, -m, 0, m, -h, B, r, -c, w, w, -c, r, B, -h, m,}
{x, -f, m, -E, -q, b, -t, -B, j, -i, A, u, -c, p, F, -n, e, -w, -y, g, -l, D, r, -a, s, C, -k, h, -z, -v, d, -o,}
{y, -i, h, -x, -z, j, -g, w, A, -k, f, -v, l, -e, u, C, -m, d, -t, -D, n, -c, s, E, -o, b, -r, -F, p, -a, q,}
{z, -l, c, -q, E, u, -g, h, -v, -D, p, -b, m, -A, -y, k, -d, r, -F, -t, f, -i, w, C, -o, a, -n, B, x, -j, e, -s,}

-continued

{A, -o, c, -j, v, F, -t, h, -e, q, -C, -y, m, -a, l, -x, -D, r, -f, g, -s, E, w, -k, b, -n, z, B, -p, d, -i, u,}
{B, -r, h, -c, m, -w, 0, w, -m, c, -h, r, -B, -B, r, -h, c, -m, w, 0, -w, m, -c, h, -r, B, B, -r, h, -c, m, -w}
{C, -u, m, -e, d, -l, t, -B, -D, v, -n, f, -c, k, -s, A, E, -w, o, -g, b, -j, r, -z, -F, x, -p, h, -a, i, -q, y,}
{D, -x, r, -l, f, -a, g, -m, s, -y, E, C, -w, q, -k, e, -b, h, -n, t, -z, F, B, -v, p, -j, d, -c, i, -o, u, -A,}
{E, -A, w, -s, o, -k, g, -c, b, -f, j, -n, r, -v, z, -D, -F, B, -x, t, -p, l, -h, d, -a, e, -i, m, -q, u, -y, C,}
{F, -D, B, -z, x, -v, t, -r, p, -n, l, -j, h, -f, d, -b, a, -c, e, -g, i, -k, m, -o, q, -s, u, -w, y, -A, C, -E,}
where {a, b, c, d, e, f, g, h, i, j, k, l, m, n, o, p, q, r, s, t, u, v, w, x, y, z, A, B, C, D, E, F } =
{90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4}.

In VVC, the max transform size can be specified as 64-length (e.g., 64×64 blocks) or 32-length (e.g., 32×32 blocks), and the selection can be signaled in a sequence parameter set (SPS). A related syntax in SPS and semantics can be described in Table 3 as follows:

TABLE 3

Sequence parameter set RBSP syntax for max transform size selection

| | Descriptor |
|---|---|
| seq_parameter_set_rbsp( ) { | |
|   sps_seq_parameter_set_id | u(4) |
|   sps_video_parameter_set_id | u(4) |
|   sps_max_sublayers_minus1 | u(3) |
|   sps_reserved_zero_4bits | u(4) |
|   sps_ptl_dpb_hrd_params_present_flag | u(1) |
|   if( sps_ptl_dpb_hrd_params_present_flag ) | |
|     profile_tier_level( 1, sps_max_sublayers_minus1 ) | |
|   gdr_enabled_flag | u(1) |
|   chroma_format_idc | u(2) |
|   if( chroma_format_idc = = 3 ) | |
|     separate_colour_plane_flag | u(1) |
|   res_change_in_clvs_allowed_flag | u(1) |
|   pic_width_max_in_luma_samples | ue(v) |
|   pic_height_max_in_luma_samples | ue(v) |
|   sps_conformance_window_flag | u(1) |
|   if( sps_conformance_window_flag ) { | |
|     sps_conf_win_left_offset | ue(v) |
|     sps_conf_win_right_offset | ue(v) |
|     sps_conf_win_top_offset | ue(v) |
|     sps_conf_win_bottom_offset | ue(v) |
|   } | |
|   sps_log2_ctu_size_minus5 | u(2) |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     sps_subpic_id_len_minus1 | ue(v) |
|     subpic_id_mapping_explicitly_signalled_flag | u(1) |
|     if( subpic_id_mapping_explicitly_signalled_flag ) { | |
|       subpic_id_mapping_in_sps_flag | u(1) |
|       if( subpic_id_mapping_in_sps_flag ) | |
|         for( i = 0; i <= sps_num_subpics_minus1; i++ ) | |

TABLE 3-continued

Sequence parameter set RBSP syntax for max transform size selection

| | Descriptor |
|---|---|
|         sps_subpic_id[ i ] | u(v) |
|    } | |
| } | |
| bit_depth_minus8 | ue(v) |
| sps_entropy_coding_sync_enabled_flag | u(1) |
| if( sps_entropy_coding_sync_enabled_flag ) | |
|    sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|    poc_msb_len_minus1 | ue(v) |
| num_extra_ph_bits_bytes | u(2) |
| extra_ph_bits_struct( num_extra_ph_bits_bytes ) | |
| num_extra_sh_bits_bytes | u(2) |
| extra_sh_bits_struct( num_extra_sh_bits_bytes ) | |
| if( sps_max_sublayers_minus1 > 0 ) | |
|    sps_sublayer_dpb_params_flag | u(1) |
| if( sps_ptl_dpb_hrd_params_present_flag ) | |
|    dpb_parameters( sps_max_sublayers_minus1, sps_sublayer_dpb_params_flag ) | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < rpl1_same_as_rpl0_flag ? 1 : 2; i++ ) { | |
|    num_ref_pic_lists_in_sps[ i ] | ue(v) |
|    for( j = 0; j < num_ref_pic_lists_in_sps[ i ]; j++) | |
|       ref_pic_list_struct( i, j ) | |
| } | |
| if( ChromaArrayType != 0 ) | |
|    qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_max_mtt_hierarchy_depth_intra_slice_luma | ue(v) |
| if( sps_max_mtt_hierarchy_depth_intra_slice_luma != 0 ) { | |
|    sps_log2_diff_max_bt_min_qt_intra_slice_luma | ue(v) |
|    sps_log2_diff_max_tt_min_qt_intra_slice_luma | ue(v) |
| } | |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { | |
|    sps_log2_diff_max_bt_min_qt_inter_slice | ue(v) |
|    sps_log2_diff_max_tt_min_qt_inter_slice | ue(v) |
| } | |
| if( qtbtt_dual_tree_intra_flag ) { | |
|    sps_log2_diff_min_qt_min_cb_intra_slice_chroma | ue(v) |
|    sps_max_mtt_hierarchy_depth_intra_slice_chroma | ue(v) |
|    if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|    } | |
| } | |
| sps_max_luma_transform_size_64_flag | u(1) |
| if( ChromaArrayType != 0 ) { | |
|    sps_joint_cbcr_enabled_flag | u(1) |
|    same_qp_table_for_chroma | u(1) |
|    numQpTables = same_qp_table_for_chroma ? 1 : ( sps_joint_cbcr_enabled_flag ? 3 : 2 ) | |
|    for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|          delta_qp_in_val_minus1[ i ][ j ] | ue(v) |
|          delta_qp_diff_val[ i ][ j ] | ue(v) |
|       } | |
|    } | |
| } | |
| sps_sao_enabled_flag | u(1) |
| sps_alf_enabled_flag | u(1) |
| if( sps_alf_enabled_flag && ChromaArrayType != 0 ) | |
|    sps_ccalf_enabled_flag | u(1) |
| sps_transform_skip_enabled_flag | u(1) |
| if( sps_transform_skip_enabled_flag ) { | |
|    log2_transform_skip_max_size_minus2 | ue(v) |
|    sps_bdpcm_enabled_flag | u(1) |

TABLE 3-continued

Sequence parameter set RBSP syntax for max transform size selection

| | Descriptor |
|---|---|
| } | |
| sps_ref_wraparound_enabled_flag | u(1) |
| sps_temporal_mvp_enabled_flag | u(1) |
| if( sps_temporal_mvp_enabled_flag ) | |
|     sps_sbtmvp_enabled_flag | u(1) |
| sps_amvr_enabled_flag | u(1) |
| sps_bdof_enabled_flag | u(1) |
| if( sps_bdof_enabled_flag ) | |
|     sps_bdof_pic_present_flag | u(1) |
| sps_smvd_enabled_flag | u(1) |
| sps_dmvr_enabled_flag | u(1) |
| if( sps_dmvr_enabled_flag) | |
|     sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0 ) | |
|     sps_cclm_enabled_flag | u(1) |
| if( chroma_format_idc = = 1 ) { | |
|     sps_chroma_horizontal_collocated_flag | u(1) |
|     sps_chroma_vertical_collocated_flag | u(1) |
| } | |
| sps_mts_enabled_flag | u(1) |
| if( sps_mts_enabled_flag ) { | |
|     sps_explicit_mts_intra_enabled_flag | u(1) |
|     sps_explicit_mts_inter_enabled_flag | u(1) |
| } | |
| six_minus_max_num_merge_cand | ue(v) |
| sps_sbt_enabled_flag | u(1) |
| sps_affine_enabled_flag | u(1) |
| if( sps_affine_enabled_flag ) { | |
|     five_minus_max_num_subblock_merge_cand | ue(v) |
|     sps_affine_type_flag | u(1) |
|     if( sps_amvr_enabled_flag ) | |
|         sps_affine_amvr_enabled_flag | u(1) |
|     sps_affine_prof_enabled_flag | u(1) |
|     if( sps_affine_prof_enabled_flag ) | |
|         sps_prof_pic_present_flag | u(1) |
| } | |
| sps_palette_enabled_flag | u(1) |
| if( ChromaArrayType = = 3 && !sps_max_luma_transform_size_64_flag ) | |
|     sps_act_enabled_flag | u(1) |
| if( sps_transform_skip_enabled_flag \|\| sps_palette_enabled_flag ) | |
|     min_qp_prime_ts_minus4 | ue(v) |
| sps_bcw_enabled_flag | u(1) |
| sps_ibc_enabled_flag | u(1) |
| if( sps_ibc_enabled_flag ) | |
|     six_minus_max_num_ibc_merge_cand | ue(v) |
| sps_ciip_enabled_flag | u(1) |
| if( sps_mmvd_enabled_flag ) | |
|     sps_fpel_mmvd_enabled_flag | u(1) |
| if( MaxNumMergeCand >= 2 ) { | |
|     sps_gpm_enabled_flag | u(1) |
|     if( sps_gpm_enabled_flag && MaxNumMergeCand >= 3 ) | |
|         max_num_merge_cand_minus_max_num_gpm_cand | ue(v) |
| } | |
| sps_lmcs_enabled_flag | u(1) |
| sps_lfnst_enabled_flag | u(1) |
| sps_ladf_enabled_flag | u(1) |
| if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|         sps_ladf_qp_offset[ i ] | se(v) |
|         sps_ladf_delta_threshold_minus1[ i ] | ue(v) |
|     } | |
| } | |
| log2_parallel_merge_level_minus2 | ue(v) |
| sps_explicit_scaling_list_enabled_flag | u(1) |
| sps_dep_quant_enabled_flag | u(1) |
| if( !sps_dep_quant_enabled_flag ) | |
|     sps_sign_data_hiding_enabled_flag | u(1) |
| sps_virtual_boundaries_enabled_flag | u(1) |
| if( sps_virtual_boundaries_enabled_flag ) { | |
|     sps_virtual_boundaries_present_flag | u(1) |

TABLE 3-continued

Sequence parameter set RBSP syntax for max transform size selection

| | Descriptor |
|---|---|
|     if( sps_virtual_boundaries_present_flag ) { | |
|         sps_num_ver_virtual_boundaries | u(2) |
|         for( i = 0; i < sps_num_ver_virtual_boundaries; i++ ) | |
|             sps_virtual_boundaries_pos_x[ i ] | u(13) |
|         sps_num_hor_virtual_boundaries | u(2) |
|         for( i = 0; i < sps_num_hor_virtual_boundaries; i++ ) | |
|             sps_virtual_boundaries_pos_y[ i ] | u(13) |
|     } | |
| } | |
| if( sps_ptl_dpb_hrd_params_present_flag ) { | |
|     sps_general_hrd_params_present_flag | u(1) |
|     if( sps_general_hrd_params_present_flag ) { | |
|         general_hrd_parameters( ) | |
|         if( sps_max_sublayers_minus1 > 0 ) | |
|             sps_sublayer_cpb_params_present_flag | u(1) |
|         firstSubLayer = sps_sublayer_cpb_params_present_flag ? 0 : | |
|             sps_max_sublayers_minus1 | |
|         ols_hrd_parameters( firstSubLayer, sps_max_sublayers_minus1 ) | |
|     } | |
| } | |
| field_seq_flag | u(1) |
| vui_parameters_present_flag | u(1) |
| if( vui_parameters_present_flag ) | |
|     vui_parameters( ) /* Specified in ITU-T H.SEI \| ISO/IEC 23002-7 */ | |
| sps_extension_flag | u(1) |
| if( sps_extension_flag ) | |
|     while( more_rbsp_data( ) ) | |
|         sps_extension_data_flag | u(1) |
| rbsp_trailing_bits( ) | |
| } | |

As shown in Table 3, a max transform size flag (e.g., sps_max_luma_transform_size_64_flag) can be applied to indicate the max transform size. The max transform size flag (e.g., sps_max_luma_transform_size_64_flag) equal to 1 can specify that the maximum transform size in luma samples is equal to 64. The max transform size flag (e.g., sps_max_luma_transform_size_64_flag) equal to 0 can specify that the maximum transform size in luma samples is equal to 32.

In addition, when CtbSizeY is less than 64, the value of sps_max_luma_transform_size_64_flag can be equal to 0. The variables MinTbLog2SizeY, MaxTbLog2SizeY, MinTbSizeY, and MaxTbSizeY can be derived as follows in equations (1)-(4):

$$\text{MinTbLog2Size}Y = 2 \tag{Eq. 1}$$

$$\text{MaxTbLog2Size}Y = \text{sps\_max\_luma\_transform\_size\_64\_flag} ? 6 : 5 \tag{Eq. 2}$$

$$\text{MinTbSize}Y = 1 << \text{MinTbLog2Size}Y \tag{Eq. 3}$$

$$\text{MaxTbSize}Y = 1 << \text{MaxTbLog2Size}Y \tag{Eq. 4}$$

In some embodiments, for efficient coding of RGB video content, an in-loop color transform can be employed to handle different characteristics of image blocks, such as in VVC. As the color transform can be used adaptively for different CUs, the color transform as a coding tool can be referred to as adaptive color transform (ACT). The ACT can operate in the residue domain in some examples. A CU-level flag may be signaled to indicate the usage of ACT.

For example, screen content is often captured in the RGB color space. For an image block in the RGB color space, usually, there can be strong correlation among different color components such that a color space conversion is useful for removing inter-color component redundancy. However, for screen content, there may exist many image blocks containing different features having very saturated colors, which leads to less correlation among color components. For those blocks, coding directly in the RGB color space may be more effective. Accordingly, color space conversion can be adaptively applied to image blocks with different characteristics.

In an example, the forward ACT color transform (e.g., transform performed at encoder) may be performed as follows in equation (5) to convert an image block in the RGB color space to a YCoCg color space:

$$\begin{bmatrix} Y \\ C_g \\ C_o \end{bmatrix} = \frac{1}{4} \begin{bmatrix} 1 & 2 & 1 \\ -1 & 2 & -1 \\ 2 & 0 & -2 \end{bmatrix} \times \begin{bmatrix} R \\ G \\ B \end{bmatrix} \tag{Eq. 5}$$

The backward ACT color transform (e.g., inverse transform performed at decoder) may be performed in equation (6) as follows:

$$\begin{bmatrix} R \\ G \\ B \end{bmatrix} = \begin{bmatrix} 1 & -1 & 1 \\ 1 & 1 & 0 \\ 1 & -1 & -1 \end{bmatrix} \times \begin{bmatrix} Y \\ C_g \\ C_o \end{bmatrix} \tag{Eq. 6}$$

Figure 9:
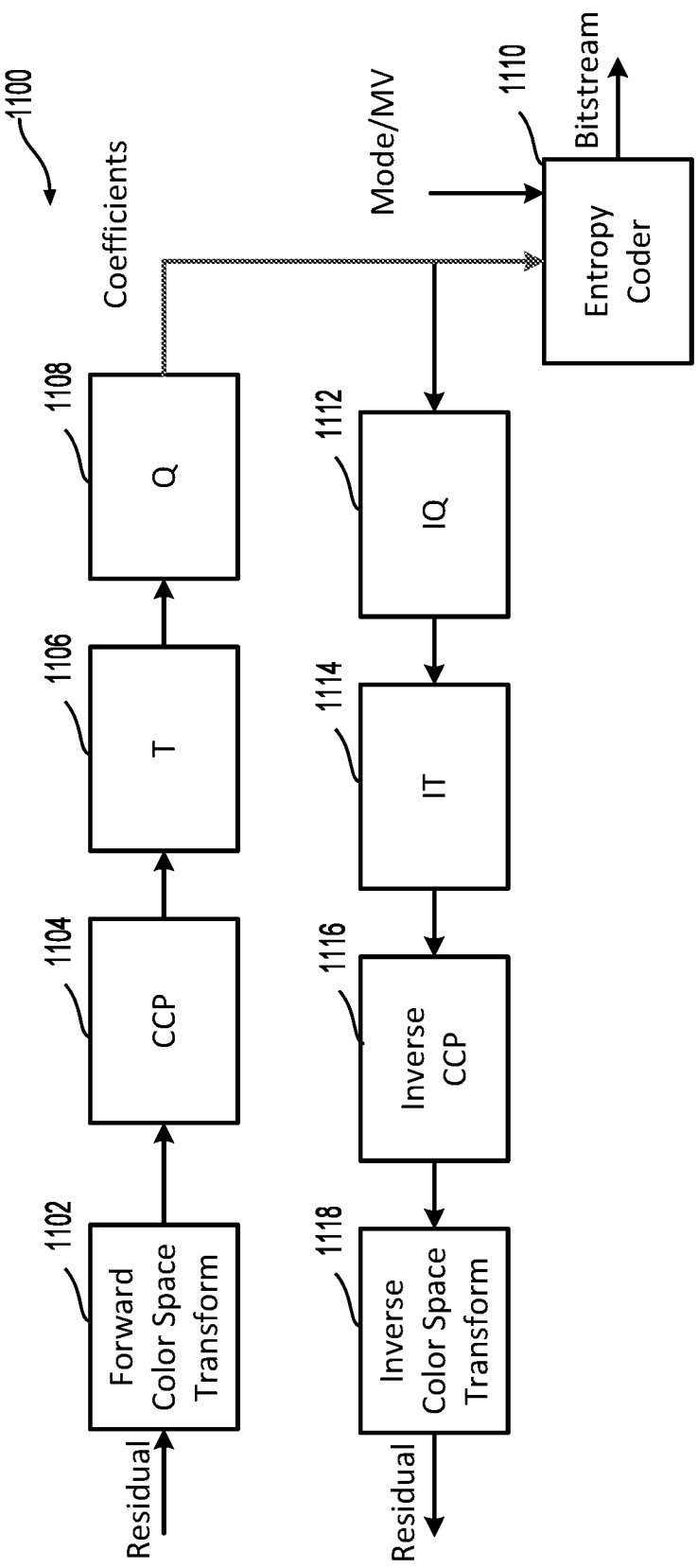
FIG. 9 illustrates an exemplary encoder for performing a color space transform in accordance with an embodiment.

FIG. 9 illustrates an exemplary encoder (1100) for performing a color space transform. The components of the encoder (1100) can be implemented by processing circuitry (e.g., one or more processors), software, or a combination thereof, for example.

In FIG. 9, prediction is performed prior to the color space transform being applied. For example, inter prediction or intra prediction can be performed on a current block to produce a residual signal. The residual signal can be provided to a forward color space transform unit (1102) to perform a forward transform such as the transform in equation (5). The output of the forward color space transform can be provided to a cross component prediction (CCP) unit (1104). The output of the (CCP) unit (1104) can be provided to a transform (T) unit (1106) to perform a transform such as a type of discrete cosine transform (DCT) to generate transform coefficients. The output of the transform unit (1106) can be provided to a quantizer (Q) (1108) to produce quantized coefficients. The quantized coefficients can be provided to an entropy coder unit (1110) to convert bins of the quantized coefficients to bits in a bitstream. The entropy coder unit (1110) may receive intra prediction mode or motion vector (MV) information associated with the current block, and entropy encoding that information into the bitstream.

The encoder (1100) may also include the components to reconstruct a residual signal. For example, the quantized coefficients may be provided to an inverse quantizer (IQ) unit (1112). The output of the inverse quantizer unit (IQ) may be provided to an inverse transform (IT) unit (1114). The output of the inverse transform (IT) unit (1114) may be provided to an inverse CCP unit (1116). The output of the inverse CCP unit (1116) may be provided to an inverse color space transform unit (1118) where an inverse color transform such as the transform illustrated in equation (6) may be performed to generate the reconstructed residual signal.

Figure 10:
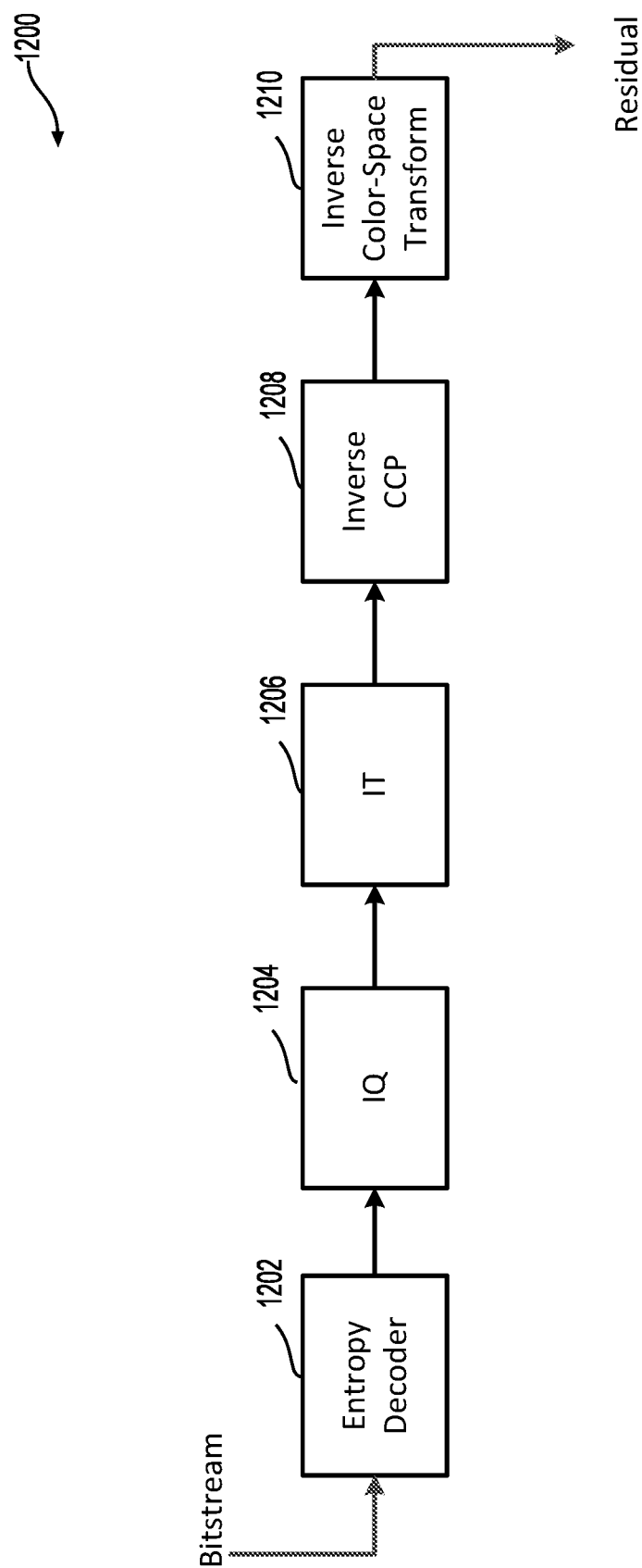
FIG. 10 illustrates an exemplary decoder for converting a bitstream to a residual signal in accordance with an embodiment.

FIG. 10 illustrates an exemplary decoder (1200) for converting a bitstream into a residual signal. The components of the decoder (1200) can be implemented by processing circuitry (e.g., one or more processors), software, or a combination thereof, for example.

The bitstream illustrated in FIG. 10 may be the bitstream produced by the entropy coder (1110) in the FIG. 9 example. The bitstream may be provided to an entropy decoder unit (1202). The output of an entropy decoder unit (1202) may be provided to an inverse quantizer (IQ) unit (1204). The output of the inverse quantizer unit (IQ) (1204) may be provided to an inverse transform (IT) unit (1206). The output of the inverse transform (IT) unit (1206) may be provided to an inverse CCP unit (1208). The output of the inverse CCP unit (1208) may be provided to an inverse color space transform unit (1210) where an inverse color transform such as the transform illustrated in equation (6) may be performed to produce the residual signal. Intra prediction or inter prediction may be performed to generate a prediction block which is combined with the residual signal to reconstruct a current block.

As noted above, the components illustrated in FIGS. 9 and 10 may be implemented in software executed by a processor or by circuitry such as a specialized integrated circuit designed to perform the function of each unit.

In some embodiments, when ACT is enabled in SPS, the max transform size can be restricted to be 32-length (e.g., 32×32 blocks, or 32 samples), in VCC for example. That is, if the max transform size is signaled as 64-length (e.g., 64×64 blocks, or 64 samples), ACT may not be applied and the related SPS flag for enabling ACT may not be signaled. The related syntax can be shown in Table 4.

TABLE 4

| Syntax for ACT implementation based on max transform size | |
| --- | --- |
| sps_palette_enabled_flag | u(1) |
| if( ChromaArrayType = = 3 && | |
| !sps_max_luma_transform_size_64_flag ) | |
| sps_act_enabled_flag | u(1) |

In VVC for example, ACT is not applied when Dual tree is applied, which can be indicated in Table 5.

TABLE 5

| Syntax for ACT implementation based on partition mode | |
| --- | --- |
| if( CuPredMode[ chType ][ x0 ][y0 ] = = MODE_INTRA && | |
| sps_act_enabled_flag && treeType = = SINGLE_TREE ) | |
| cu_act_enabled_flag | ae(v) |

In VVC for example, the max transform size is signaled in SPS. However, when ACT is applied, for a dual tree coded slice (e.g., blocks of the slice that are coded through dual tree partition mode), the maximum transform size can only be 32-length though ACT may not be used in a dual tree coded slice. This may limit the coding performance of the dual tree coded slice.

In an embodiment of current disclosure that is shown in Table 6, a max transform size applied for an intra slice and an inter slice can be signaled to a decoder separately. In an example, the intra slice can include a slice that is coded by intra prediction mode. The inter slice can include blocks that are coded by one or a combination of the intra and inter prediction modes. For example, a first portion of the blocks can be coded by inter prediction mode and a second portion of the blocks can be coded by intra prediction mode. The inter slice can also include blocks that are all coded by intra prediction mode, or blocks that are all coded by inter prediction mode.

TABLE 6

| Sequence parameter set RBSP syntax for ACT implementation | |
| --- | --- |
| | Descriptor |
| seq_parameter_set_rbsp( ) { | |
| ...... | |
|     if( ChromaArrayType != 0 ) | |
|         qtbtt_dual_tree_intra_flag | u(1) |
| ....... | |
|     if( qtbtt_dual_tree_intra_flag ) { | |
|         sps_log2_diff_min_qt_min_cb_intra_slice_chroma | ue(v) |
|         sps_max_mtt_hierarchy_depth_intra_slice_chroma | ue(v) |
|         if( sps_max_mtt_hierarchy_depth_intra_slice_chroma != 0 ) { | |
|             sps_log2_diff_max_bt_min_qt_intra_slice_chroma | ue(v) |

TABLE 6-continued

Sequence parameter set RBSP syntax for ACT implementation

| | Descriptor |
|---|---|
|         sps_log2_diff_max_tt_min_qt_intra_slice_chroma | ue(v) |
|         } | |
|     } | |
| } | |
| sps_intra_max_luma_transform_size_64_flag | u(1) |
| sps_inter_max_luma_transform_size_64_flag | u(1) |
| if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|         qp_table_start_minus26[ i ] | se(v) |
|         num_points_in_qp_table_minus1[ i ] | ue(v) |
|         for( j = 0; j <= num_points_in_qp_table_minus1[ i ]; j++ ) { | |
|             delta_qp_in_val_minus1[ i ][ j ] | ue(v) |
|             delta_qp_diff_val[ i ][ j ] | ue(v) |
|         } | |
|     } | |
| } | |
| ...... | |
|     sps_palette_enabled_flag | u(1) |
|     if( ChromaArrayType == 3 && ( (!sps_intra_max_luma_transform_size_64_flag && !qtbtt_dual_tree_intra_flag ) \|\| !sps_inter_max_luma_transform_size_64_flag) | |
|         sps_act_enabled_flag | u(1) |
|     if( sps_transform_skip_enabled_flag \|\| sps_palette_enabled_flag ) | |
|         min_qp_prime_ts_minus4 | ue(v) |
|     sps_bcw_enabled_flag | u(1) |
|     sps_ibc_enabled_flag | u(1) |
| ...... | |
| } | |

As shown in Table 6, separate flags such as a maximum transform size flag for the intra slice (e.g., sps_intra_max_luma_transform_size_64_flag) and a maximum transform size flag for the inter slice (e.g., sps_inter_max_luma_transform_size_64_flag) can be signaled. The maximum transform size flags can indicate the maximum transform size, in luma samples for example. For example, the maximum transform size flags can indicate whether the maximum transform size is a first maximum value or a second maximum value. The maximum transform size flag for the intra slice (e.g., sps_intra_max_luma_transform_size_64_flag) equal to 1 can specify that the maximum transform size intra slice in luma samples is equal to 64 (e.g., 64×64 blocks). The maximum transform size flag for the intra slice (e.g., sps_intra_max_luma_transform_size_64_flag) equal to 0 can specify that the maximum transform size in intra slice in luma samples is equal to 32 (e.g., 32×32 blocks). In addition, the maximum transform size flag for the inter slice (e.g., sps_inter_max_luma_transform_size_64_flag) equal to 1 can specify that the maximum transform size inter slice in luma samples is equal to 64 (e.g., 64×64 blocks). The maximum transform size flag for the inter slice (e.g., sps_inter_max_luma_transform_size_64_flag) equal to 0 can specify that the maximum transform size in inter slice in luma samples is equal to 32 (e.g., 32×32 blocks).

Still referring to Table 6, a partition mode flag (e.g., qtbtt_dual_tree_intra_flag) and an ACT enable flag (e.g., sps_act_enabled_flag) can be signaled. The partition mode flag (e.g., qtbtt_dual_tree_intra_flag) can indicate whether a dual tree partition mode is applied to the intra slice. The ACT enable flag (e.g., sps_act_enabled_flag) can indicate whether the ACT is applied to the intra slice of inter slice. As shown in Table 6, when the maximum transform size flag for the intra slice (e.g., sps_intra_max_luma_transform_size_64_flag) is equal to 0, and the partition mode flag (e.g., qtbtt_dual_tree_intra_flag) is equal to 0, or the maximum transform size flag for the inter slice (e.g., sps_inter_max_luma_transform_size_64_flag) is equal to 0, the ACT enable flag (e.g., sps_act_enabled_flag) can be signaled.

In an embodiment, the max transform size for intra slice (e.g., sps_intra_max_luma_transform_size_64_flag) can be coded only when the partition mode flag (e.g., qtbtt_dual_tree_intra_flag) is coded as true (or as a first value), for example indicating that the dual tree partition mode is applied.

In an embodiment, the max transform size applied for the intra slice and the inter slice can be signaled separately only when the partition mode flag (e.g., flag qtbtt_dual_tree_intra_flag) is coded as true. If the partition mode flag (e.g., qtbtt_dual_tree_intra_flag) is not true, the max transform size is signaled and shared between intra and inter slice.

The max transform size can be signaled in various portions of the coded bitstream, such as a SPS, a slice header or a picture header (PH).

In some embodiments, a max transform size applied for a dual tree coded slice and a max transform size for a single tree coded slice can be signaled separately. The related syntax can be shown in Table 7.

TABLE 7

Sequence parameter set RBSP syntax for ACT implementation

| | Descriptor |
|---|---|
| seq_parameter_set_rbsp( ) { | |
| ...... | |
|     if( ChromaArrayType != 0 ) | |
|         qtbtt_dual_tree_intra_flag | u(1) |
| ....... | |
|     if( qtbtt_dual_tree_intra_flag ) { | |
|         sps_log2_diff_min_qt_min_cb_intra_slice_chroma | ue(v) |
|         sps_max_mtt_hierarchy_depth_intra_slice_chroma | ue(v) |
|         if( sps_max_mtt_hierarchy_depth_intra_slice_chroma != 0 ) { | |
|             sps_log2_diff_max_bt_min_qt_intra_slice_chroma | ue(v) |
|             sps_log2_diff_max_tt_min_qt_intra_slice_chroma | ue(v) |
|         } | |
|     } | |
|     if(qtbtt_dual_tree_intra_flag) | |
|         sps_dt_max_luma_transform_size_64_flag | u(1) |
|     sps_st_max_luma_transform_size_64_flag | u(1) |
|     if( ChromaArrayType != 0 ) { | |
|         sps_joint_cbcr_enabled_flag | u(1) |
|         same_qp_table_for_chroma | u(1) |
|         numQpTables = same_qp_table_for_chroma ? 1 : ( sps_joint_cbcr_enabled_flag ? 3 : 2 ) | |
|         for( i = 0; i < numQpTables; i++ ) { | |
|             qp_table_start_minus26[ i ] | se(v) |
|             num_points_in_qp_table_minus1[ i ] | ue(v) |
|             for( j = 0; j <= num_points_in_qp_table_minus1[ i ]; j++ ) { | |
|                 delta_qp_in_val_minus1[ i ][ j ] | ue(v) |
|                 delta_qp_diff_val[ i ][ j ] | ue(v) |
|             } | |
|         } | |
|     } | |
| ...... | |
|     sps_palette_enabled_flag | u(1) |
|     if( ChromaArrayType = = 3 && !sps_st_max_luma_transform_size_64 flag) | |
|         sps_act_enabled_flag | u(1) |
|     if( sps_transform_skip_enabled_flag \|\| sps_palette_enabled_flag ) | |
|         min_qp_prime_ts_minus4 | ue(v) |
|     sps_bcw_enabled_flag | u(1) |
|     sps_ibc_enabled_flag | u(1) |
| ...... | |
| } | |

As shown in Table 7, a max transform size flag for the dual tree coded slice (e.g., sps_dt_max_luma_transform_size_64_flag), and a max transform size flag for the single tree coded slice (e.g., sps_st_max_luma_transform_size_64_flag) can be signalled. The maximum transform size flags can indicate the maximum transform size, in luma samples for example. For example, the maximum transform size flags can indicate whether the maximum transform size is a first maximum value or a second maximum value. The max transform size flag for the dual tree coded slice (e.g., sps_dt_max_luma_transform_size_64_flag) equal to 1 can specify that the maximum transform size applied for dual tree coded slice in luma samples is equal to 64 (e.g., 64×64 blocks). The max transform size flag for the dual tree coded slice (e.g., sps_dt_max_luma_transform_size_64_flag) equal to 0 can specify that the maximum transform size applied for dual tree coded slice in luma samples is equal to 32 (e.g., 32×32 blocks). The max transform size flag for the single tree coded slice (e.g., sps_st_max_luma_transform_size_64_flag) equal to 1 can specify that the maximum transform size applied for single tree coded slice in luma samples is equal to 64. The max transform size flag for the single tree coded slice (e.g., sps_st_max_luma_transform_size_64_flag) equal to 0 can specify that the maximum transform size applied for a single tree coded slice in luma samples is equal to 32.

Still referring to Table 7, when the chroma array type is 3 (e.g., a planar mode), and the max transform size flag for the single tree coded slice (e.g., sps_st_max_luma_transform_size_64_flag) is equal to 0, the ACT enable flag (e.g., sps_act_enabled_flag) can be signalled.

In some embodiments, the maximum transform size can be determined not only based on the maximum transform size parameter, for example in an SPS header (e.g., sps_st_max_luma_transform_size_64_flag, or sps_dt_max_luma_transform_size_64_flag), but also based on a tree type (or partition tree type) and a condition whether the adaptive color transform (ACT) is used or not. In an example, when the ACT signal in the SPS header is enabled (e.g., sps_act_enabled_flag is true) and the current tree type is the single tree, the maximum transform size applied in a current slice can be constrained to a 32-point transform (e.g., 32×32 blocks). Otherwise, the 64-point transform (e.g., 64×64 blocks) can be applied in the current slice. The example can be shown in equations (7)-(10) as follows.

As shown in equations (7)-(10), when the max transform size flag (e.g., sps_max_luma_transform_size_64_flag) is equal to 1, the maximum transform size in luma samples is equal to 64. When the max transform size flag (e.g., dsps_max_luma_transform_size_64_flag) is equal to 0, the maximum transform size in luma samples is equal to 32. When a coding unit size in Y direction (e.g., CtbSizeY) is less than 64, the value of the max transform size flag (e.g., sps_max_luma_transform_size_64_flag) can be equal to 0.

In addition, variables MinTbLog2SizeY, MaxTbLog2SizeY, MinTbSizeY, and MaxTbSizeY in can be derived equations (7)-(10) as follows:

$$\text{MinTbLog 2SizeY} = 2 \quad \text{(Eq. 7)}$$

$$\text{MaxTbLog 2SizeY} = \text{sps\_max\_luma\_transform\_size\_64\_flag}?6:5 \quad \text{(Eq. 8)}$$

$$\text{MinTbSizeY} = 1 << \text{MinTbLog 2SizeY} \quad \text{(Eq. 9)}$$

$$\text{MaxTbSizeY} = (\text{treeType} == \text{SINGLE TREE} \&\& \text{sps\_act\_enabled\_flag})?32:1<<\text{MaxTbLog2SizeY} \quad \text{(Eq. 10)}$$

As shown in equation (10), when the tree type is single tree, and the ACT enable flag (e.g., sps_act_enabled_flag) is true, the the maximum transform size in luma samples is equal to 32. Otherwise, if the tree type is not single tree, or the ACT enable flag is not true, the maximum transform size in luma samples is equal to 64.

In another embodiment, as shown in Table 8, the ACT enable flag (e.g., sps_act_enabled_flag) can be signalled in SPS independently. Thus, comparing to Table 7, the ACT enable flag (e.g., sps_act_enabled_flag) can be signalled, and be independent of the max transform size flag (e.g., sps_st_max_luma_transform_size_64_flag).

TABLE 8

Sequence parameter set RBSP syntax for ACT implementation

| | Descriptor |
|---|---|
| seq_parameter_set_rbsp( ) { | |
| ... | |
| if( ChromaArrayType == 3) | |
|     sps_act_enabled_flag | u(1) |
| ... | |
| } | |

The methods described above can be used separately or combined in any order. In the disclosure, a high-level syntax element can refer to one of a Video Parameter Set (VPS), a SPS, a Picture Parameter Set (PPS), a Slice header, a Tile header, and a Tile group header. CTU header can refer to syntax elements signaled for each CTU (e.g., as header information). In the disclosure, a transform size can refer to a maximum transform width and/height, or a maximum transform unit area size.

Figure 11:
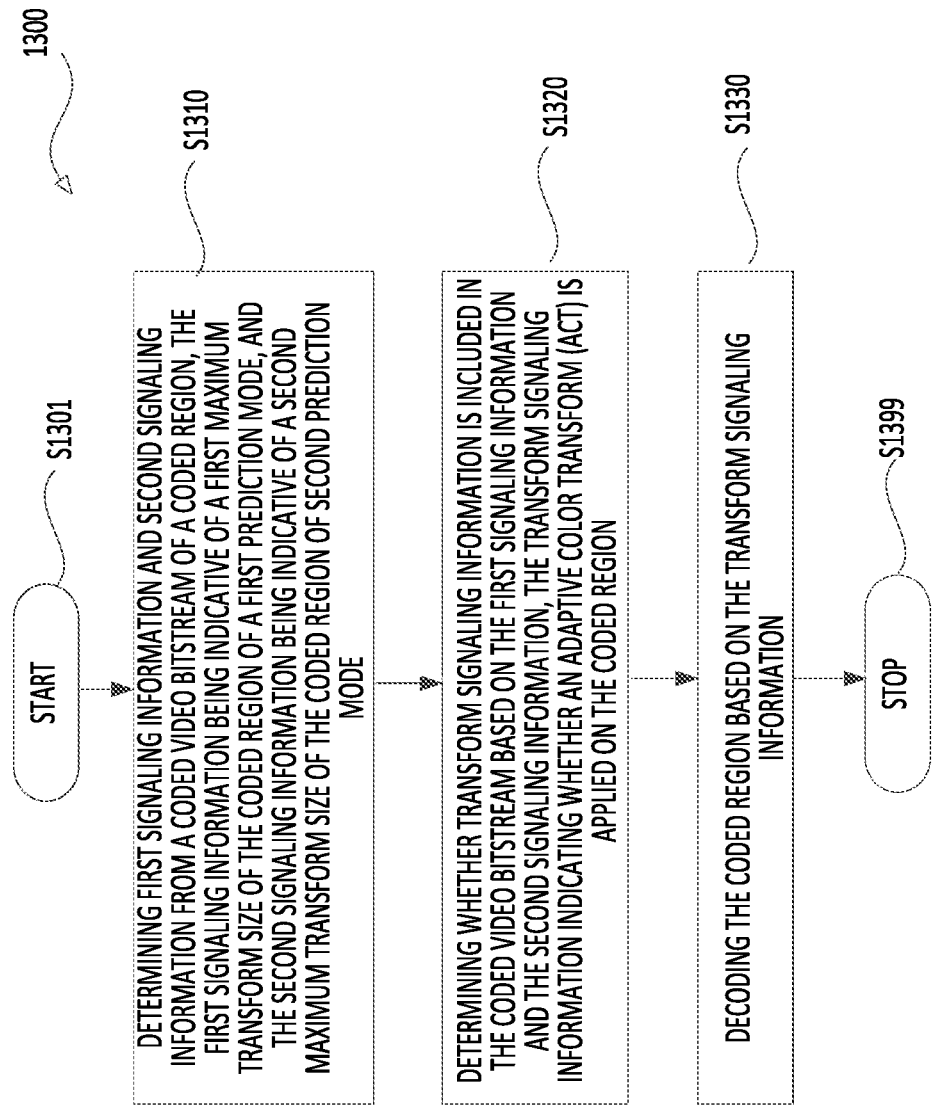
FIG. 11 shows a flow chart outlining a first process example according to some embodiments of the disclosure.
Figure 12:
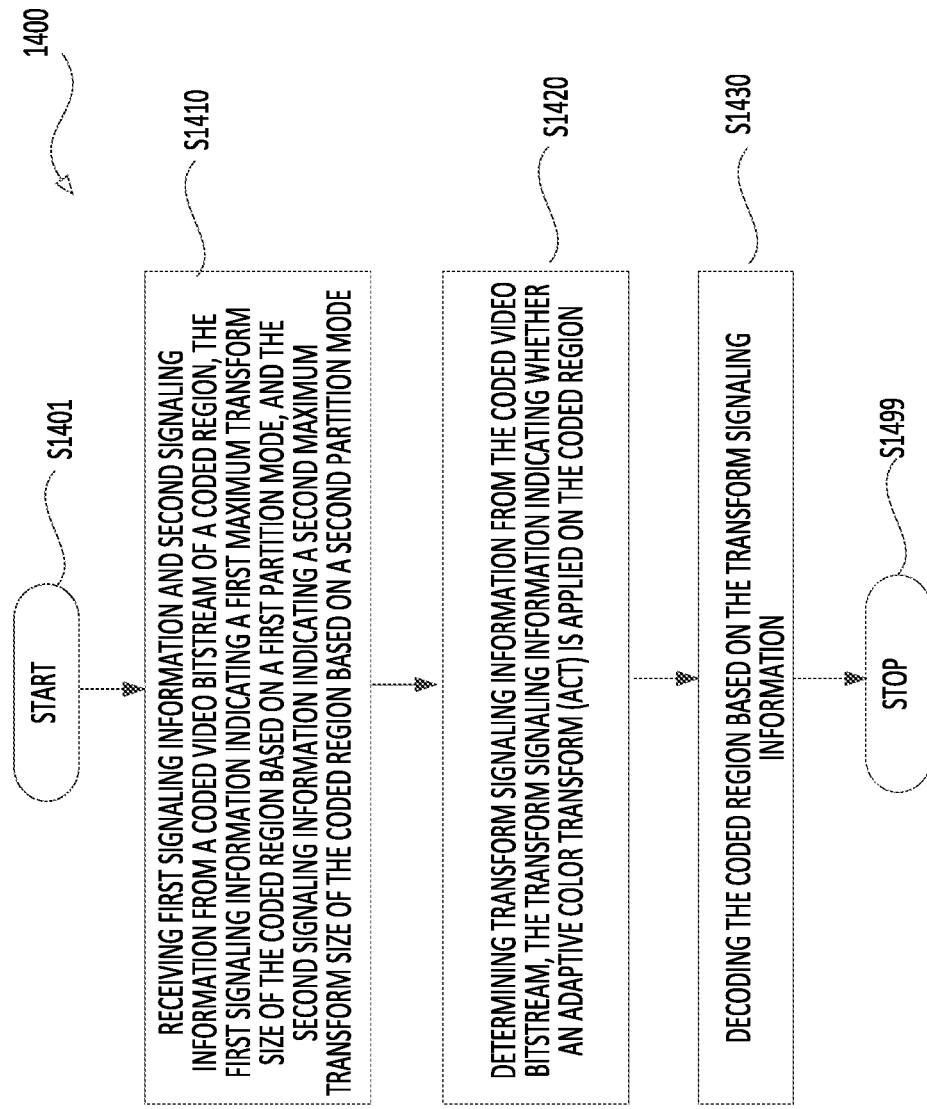
FIG. 12 shows a flow chart outlining a second process example according to some embodiments of the disclosure.

FIGS. 11 and 12 show flow charts outlining a process (1300) and a process (1400) according to embodiments of the disclosure. The processes (1300) and (1400) can be used during decoding processes for a coded video bitstream. In various embodiments, the processes (1300) and (1400) can be executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), the processing circuitry that performs functions of the decoder (1200), the processing circuitry that performs functions of the encoder (1100), and the like. In some embodiments, the processes (1300) and (1400) can be implemented in software instructions, thus when the processing circuitry executes the software instructions, the processing circuitry performs the processes (1300) and (1400) respectively.

As shown in FIG. 11, the process (1300) starts at (S1301) and proceeds to (S1310).

At (S1310), first signaling information and second signaling information can be determined from a coded video bitstream of a coded region. The first signaling information can be indicative of a first maximum transform size of the coded region of a first prediction mode, and the second signaling information can be indicative of a second maximum transform size of the coded region of a second prediction mode.

At (S1320), whether transform signaling information is included in the coded video bitstream can be determined based on the first signaling information and the second signaling information. For example, the transform signaling information can be included in the coded video bitstream when (i) the first signaling information indicates the first maximum transform size of the coded region of the first prediction mode is a first number of samples (e.g., 32 samples), and the partition signaling information indicates the dual tree partition is not applied to the coded region, or (ii) the second signaling information indicates the second maximum transform size of the coded region of the second prediction mode is a second number of samples (e.g., 32 samples). Otherwise, the transform signaling information may not be included in the coded video bitstream. The transform signaling information can indicate whether an adaptive color transform (ACT) is applied on the coded region.

At (S1330), the coded region can subsequently be decoded based on the transform signaling information.

In the process (1300), the first signaling information can indicate the first maximum transform size of the coded region for a first prediction mode is a value such as 64 samples when the first signaling information is a first value. The second signaling information can indicate the second maximum transform size of the coded region for a second prediction mode is a value such as 64 samples when the second signaling information is the first value.

In the process (1300), the coded video bitstream can further include partition signaling information, where the partition signaling information can indicate whether a dual tree partition is applied to the coded region.

In some embodiments, the transform signaling information can be determined whether is included in the coded video bitstream based on one of (i) the first signaling information indicating the first maximum transform size of the coded region of the first prediction mode is a first number of samples (e.g., 32 samples), and the partition signaling information indicating the dual tree partition is not applied to the coded region, and (ii) the second signaling information indicating the second maximum transform size of the coded region of the second prediction mode is a second number of samples (e.g., 32 samples).

In some embodiments, the first signaling information can be determined based on the partition signaling information indicating the dual tree partition is applied to the coded region.

In some embodiments, the first signaling information and the second signaling information can be determined based on the partition signaling information indicating the dual tree partition is applied to the coded region.

In some embodiments, the first maximum transform size can be equal to the second maximum transform size based on the partition signaling information indicating the dual tree partition is not applied to the coded region.

In the method, the first signaling information and the second signaling information can be indicated by a syntax element in one of a sequence parameter set, a picture parameter set, and a slice header.

As shown in FIG. 12, the process (1400) starts at (S1401) and proceeds to (S1410).

At (S1410), first signaling information and second signaling information can be received from a coded video bitstream of a coded region. The first signaling information can indicate a first maximum transform size of the coded region based on a first partition mode. The second signaling information can indicate a second maximum transform size of the coded region based on a second partition mode.

At (S4320), transform signaling information can be determined from the coded video bitstream, where the transform signaling information can indicate whether an adaptive color transform (ACT) is applied on the coded region.

At (S1430), the coded region can subsequently be decoded based on the transform signaling information.

In the process (1400), the first signaling information can indicate the first maximum transform size of the coded region is 64 samples when the first signaling information is a first value, and the second signaling information can indicate the second maximum transform size of the coded region is 64 samples when the second signaling information is the first value.

In some embodiments, the transform signaling information can be determined based on the second signaling information indicating the second maximum transform size of the coded region based on the second partition mode is 32 samples.

In some embodiments, a maximum transform size of the coded region can be determined to be 32 samples based on the second partition mode being applied and the transform signaling information indicating the ACT is applied on the coded region.

In some embodiments, a maximum transform size of the coded region can be determined to be 64 samples based on one of (i) the second partition mode not being applied, and (ii) the transform signaling information indicating the ACT is not applied on the coded region.

The techniques described above, can be implemented as computer software using computer-readable instructions and physically stored in one or more computer-readable media. For example, FIG. 13 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
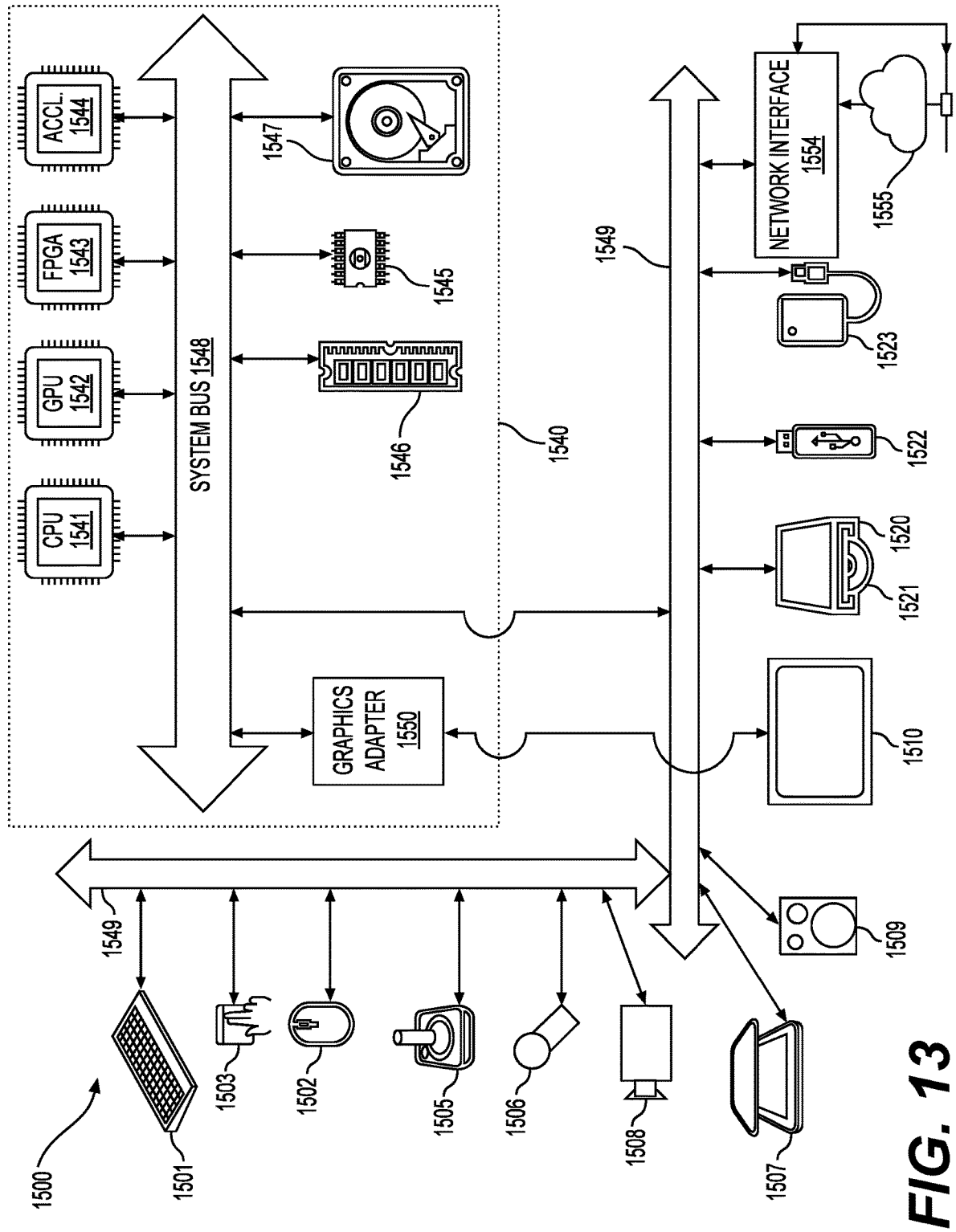
FIG. 13 is a schematic illustration of a computer system in accordance with an embodiment.

The components shown in FIG. 13 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

HEVC: High Efficiency Video Coding
HDR: high dynamic range
SDR: standard dynamic range
VVC: Versatile Video Coding
JVET: Joint Video Exploration Team
MPM: most probable mode
WAIP: Wide-Angle Intra Prediction
CU: Coding Unit
PU: Prediction Unit
ISP: Intra Sub-Partitions
SBT: Sub-block transform
CBF: Coded block flag While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of video decoding for a decoder, the method comprising:
   receiving first signaling information and second signaling information from a coded video bitstream of a coded region, the first signaling information being indicative of an intra maximum transform size of the coded region based on an intra prediction mode, and the second signaling information being indicative of an inter maximum transform size of the coded region based on an inter prediction mode;
   determining whether an adaptive color transform (ACT) is applied on the coded region based on the intra maximum transform size indicated by the received first signaling information and the inter maximum transform size indicated by the received second signaling information; and
   decoding the coded region based on whether the ACT is determined to be applied.

2. The method of claim 1, wherein:
   the first signaling information indicates the intra maximum transform size of the coded region is 64 samples when the first signaling information is a first value, and
   the second signaling information indicates the inter maximum transform size of the coded region is 64 samples when the second signaling information is the first value.

3. The method of claim 2, wherein the coded video bitstream further comprises partition signaling information, the partition signaling information indicating whether a dual tree partition is applied to the coded region.

4. The method of claim 3, wherein the determining whether the ACT is applied further comprises:
    determining whether the ACT is applied based on one of
        (i) the first signaling information indicating the intra maximum transform size of the coded region based on the intra prediction mode is 32 samples, and the partition signaling information indicating the dual tree partition is not applied to the coded region, and
        (ii) the second signaling information indicating the inter maximum transform size of the coded region based on the inter prediction mode is 32 samples.

5. The method of claim 3, wherein the receiving the first signaling information comprises:
    receiving the first signaling information based on the partition signaling information indicating the dual tree partition is applied to the coded region.

6. The method of claim 3, wherein the receiving comprises:
    receiving the first signaling information and the second signaling information based on the partition signaling information indicating the dual tree partition is applied to the coded region.

7. The method of claim 3, wherein the intra maximum transform size is equal to the inter maximum transform size based on the partition signaling information indicating the dual tree partition is not applied to the coded region.

8. The method of claim 1, wherein the first signaling information and the second signaling information are indicated by a syntax element in one of a sequence parameter set, a picture parameter set, and a slice header.

9. A method of video decoding for a decoder, the method comprising:
    receiving first signaling information and second signaling information from a coded video bitstream of a coded region, the first signaling information indicating a dual tree maximum transform size of the coded region based on a dual tree partition mode, and the second signaling information indicating a single tree maximum transform size of the coded region based on a single tree partition mode;
    determining whether an adaptive color transform (ACT) is applied on the coded region based on the dual tree maximum transform size indicated by the received first signaling information and the single tree maximum transform size indicated by the received second signaling information; and
    decoding the coded region based on whether the ACT is determined to be applied.

10. The method of claim 9, wherein:
    the first signaling information indicating the dual tree maximum transform size of the coded region is 64 samples when the first signaling information is a first value, and
    the second signaling information indicating the single tree maximum transform size of the coded region is 64 samples when the second signaling information is the first value.

11. The method of claim 10, wherein the determining further comprises:
    determining the ACT is applied on the coded region based on the second signaling information indicating the single tree maximum transform size of the coded region based on the single tree partition mode is 32 samples.

12. The method of claim 9, further comprising:
    determining a maximum transform size of the coded region is 32 samples based on the single tree partition mode being applied and the ACT being applied on the coded region.

13. The method of claim 9, further comprising:
    determining a maximum transform size of the coded region is 64 samples based on one of
    (i) the single tree partition mode not being applied, and
    (ii) the ACT not being applied on the coded region.

14. An apparatus for video decoding, comprising:
    processing circuitry configured to:
        receive first signaling information and second signaling information from a coded video bitstream of a coded region, the first signaling information being indicative of an intra maximum transform size of the coded region based on an intra prediction mode, and the second signaling information being indicative of an inter maximum transform size of the coded region based on an inter prediction mode;
        determine whether an adaptive color transform (ACT) is applied on the coded region based on the intra maximum transform size indicated by the received first signaling information and the inter maximum transform size indicated by the received second signaling information; and
        decode the coded region based on whether the ACT is determined to be applied.

15. The apparatus of claim 14, wherein:
    the first signaling information indicates the intra maximum transform size of the coded region is 64 samples when the first signaling information is a first value, and
    the second signaling information indicates the inter maximum transform size of the coded region is 64 samples when the second signaling information is the first value.

16. The apparatus of claim 15, wherein the coded video bitstream further comprises partition signaling information, the partition signaling information indicating whether a dual tree partition is applied to the coded region.

17. The apparatus of claim 16, wherein the processing circuitry is further configured to:
    determine whether the ACT is applied based on one of
        (i) the first signaling information indicating the intra maximum transform size of the coded region based on the intra prediction mode is 32 samples, and the partition signaling information indicating the dual tree partition is not applied to the coded region, and
        (ii) the second signaling information indicating the inter maximum transform size of the coded region based on the inter prediction mode is 32 samples.

18. The apparatus of claim 16, wherein the processing circuitry is further configured to:
    receive the first signaling information based on the partition signaling information indicating the dual tree partition is applied to the coded region.

19. The apparatus of claim 16, wherein the processing circuitry is further configured to:
    receive the first signaling information and the second signaling information based on the partition signaling information indicating the dual tree partition is applied to the coded region.

20. The apparatus of claim 16, wherein the intra maximum transform size is equal to the inter maximum transform size based on the partition signaling information indicating the dual tree partition is not applied to the coded region.

* * * * *